(12) United States Patent
Nakayama et al.

(10) Patent No.: US 8,189,602 B2
(45) Date of Patent: May 29, 2012

(54) AUDIO NETWORK SYSTEM

(75) Inventors: Kei Nakayama, Hamamatsu (JP);
Henning Kaltheuner, Leverkusen (DE);
Masahiro Shimizu, Hamamatsu (JP)

(73) Assignee: Yamaha Corporation, Hamamatsu-shi (JP)

( * ) Notice: Subject to any disclaimer, the term of this patent is extended or adjusted under 35 U.S.C. 154(b) by 313 days.

(21) Appl. No.: 12/690,535

(22) Filed: Jan. 20, 2010

(65) Prior Publication Data

US 2010/0118873 A1 May 13, 2010

Related U.S. Application Data

(62) Division of application No. 11/725,785, filed on Mar. 19, 2007, now Pat. No. 7,684,415.

(30) Foreign Application Priority Data

| Mar. 22, 2006 | (JP) | 2006-079464 |
| Mar. 22, 2006 | (JP) | 2006-079465 |
| Mar. 22, 2006 | (JP) | 2006-079466 |

(51) Int. Cl.
*H04L 12/56* (2006.01)
(52) U.S. Cl. ........... 370/400; 370/392; 709/220; 700/94
(58) Field of Classification Search .......... 370/400, 370/242, 389, 398; 709/220; 700/94
See application file for complete search history.

(56) References Cited

U.S. PATENT DOCUMENTS

| 5,487,067 A | 1/1996 | Matsushige |
| 5,930,375 A | 7/1999 | East et al. |
| 6,909,728 B1 | 6/2005 | Kuribayashi et al. |
| 7,606,174 B2 | 10/2009 | Ochi et al. |
| 7,684,415 B2* | 3/2010 | Nakayama et al. ........... 370/400 |
| 2002/0186136 A1 | 12/2002 | Schuman |
| 2003/0055518 A1 | 3/2003 | Aiso et al. |
| 2004/0233852 A1* | 11/2004 | Ochi et al. ................... 370/242 |
| 2005/0246041 A1* | 11/2005 | Kreifeldt et al. ............... 700/94 |

(Continued)

FOREIGN PATENT DOCUMENTS

EP  1 580 910 A2  9/2005

(Continued)

OTHER PUBLICATIONS

Notification of Reasons for Rejection mailed Aug. 22, 2011, for JP Application No. 2006-079464, with English Translation, seven pages.

(Continued)

*Primary Examiner* — Albert T Chou
(74) *Attorney, Agent, or Firm* — Morrison & Foerster LLP

(57) ABSTRACT

A plurality of partial networks can work independently from each other, and each partial network connects together several nodes including a connection node for transmission of audio signals. A connection network connects respective connection nodes of the respective partial networks so as to connect the plurality of the partial networks with each other through the connection nodes. The connection node of the partial network operates when the audio signal is transmitted from the partial network to the connection network, for forwarding the audio signal from a transmission channel used for carrying the audio signal in the partial network to another transmission channel to be used for carrying the audio signal in the connection network, and operates when the audio signal is transmitted from the connection network to the partial network, for forwarding the audio signal from a transmission channel used for carrying the audio signal in the connection network to another transmission channel to be used for carrying the audio signal in the partial network.

4 Claims, 13 Drawing Sheets

U.S. PATENT DOCUMENTS

2006/0248173 A1* 11/2006 Shimizu .................. 709/220
2007/0047712 A1* 3/2007 Gross et al. ............. 379/167.01

FOREIGN PATENT DOCUMENTS

| JP | 08-237762 A | 9/1996 |
|----|----|----|
| JP | 2000-078170 A | 3/2000 |
| JP | 2004-349776 A | 12/2004 |
| JP | 2005-210237 A | 8/2005 |
| JP | 2005-258967 A | 9/2005 |
| JP | 2005-328504 A | 11/2005 |
| WO | WO-97/36400 A1 | 10/1997 |

OTHER PUBLICATIONS

Notification of Reasons for Rejection mailed Sep. 7, 2011, for JP Application No. 2006-079464, with English Translation, six pages.

European Search Report mailed Oct. 21, 2010, for EP Application No. 07104401.0, five pages.

European Search Report mailed Jun. 28, 2011, for EP Application No. 11166551.9, four pages.

* cited by examiner

FIG.1
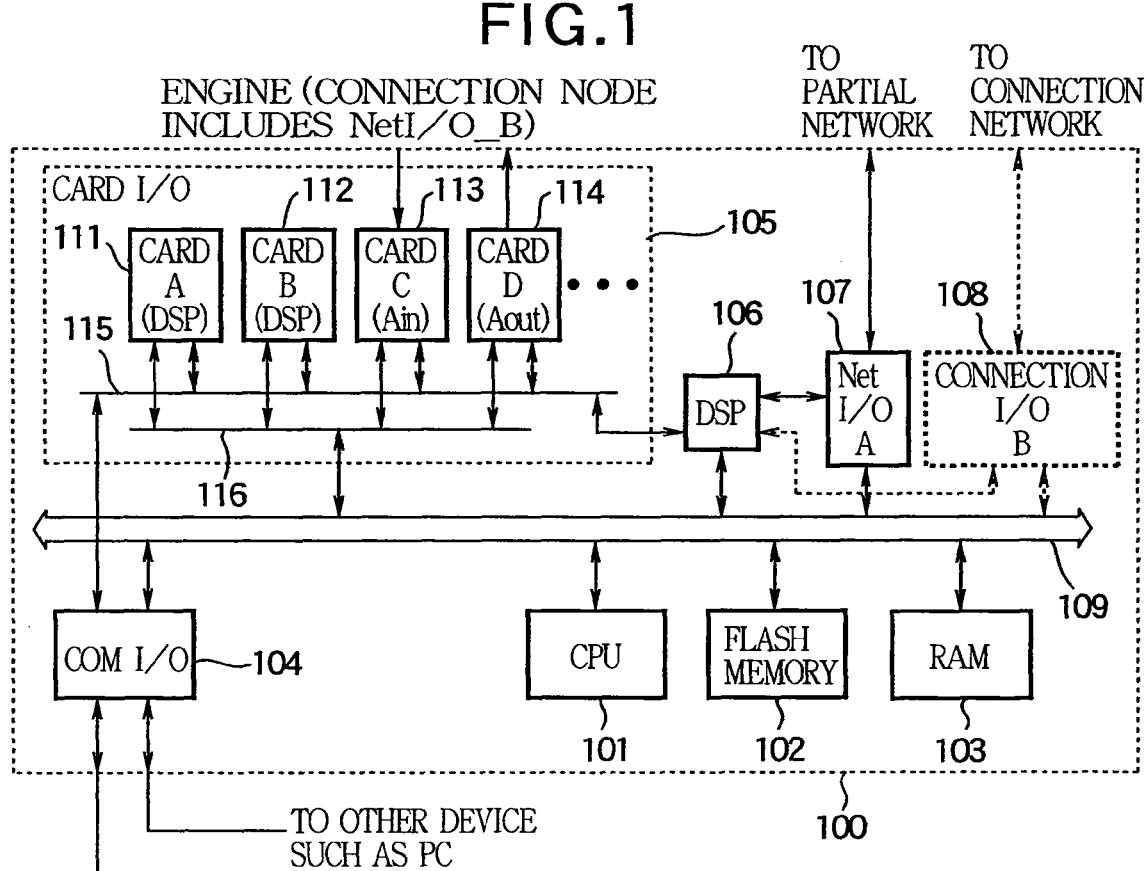
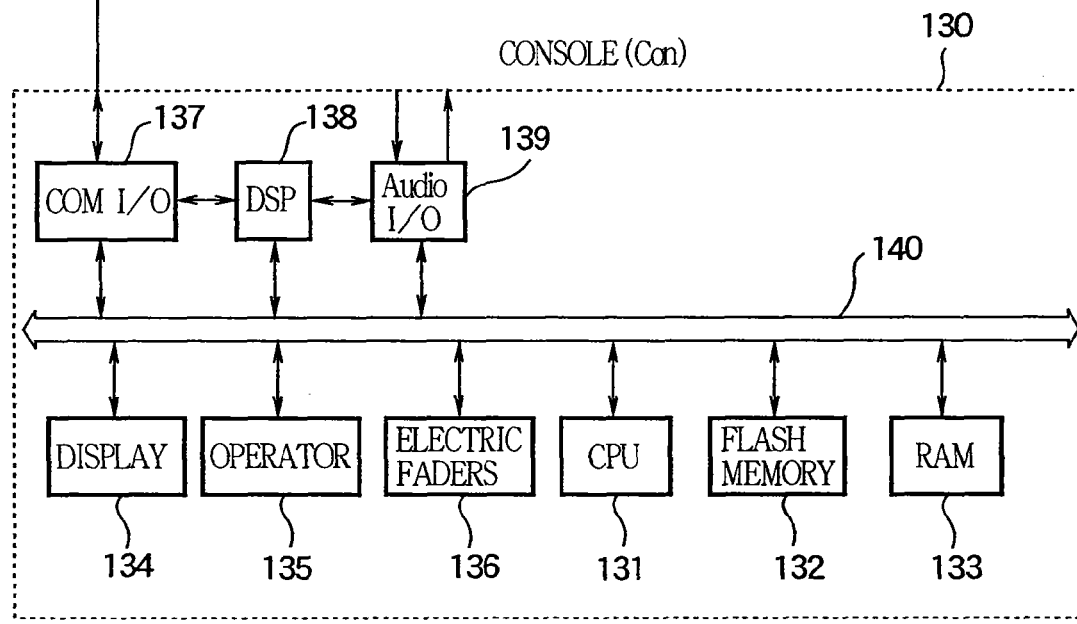

US 8,189,602 B2

AUDIO NETWORK SYSTEM

CROSS-REFERENCE TO RELATED APPLICATIONS

This application is a division of U.S. patent application Ser. No. 11/725,785 filed Mar. 19, 2007, the entire disclosure of which is incorporated herein by reference.

BACKGROUND OF THE INVENTION

1. Technical Field of the Invention

The present invention relates to an audio network system that is capable of connecting a variety of audio devices.

2. Description of the Related Art

Conventional technologies for audio signal communication in a Professional Audio (PA) network system used for PA such as plays and concerts, music production, and private broadcasting include CobraNet (registered trademark) described in Non-Patent Reference 1, SuperMAC (registered trademark) described in Non-Patent Reference 2, and EtherSound (registered trademark) described in Non-Patent Reference 3.

[Non-Patent Reference 1]
http://www.balcom.co.jp/cobranet.htm
[Non-Patent Reference 2]
http://www.sonyoxford.co.uk/pub/supermac/
[Non-Patent Reference 3]
http://www.ethersound.com/news/getnews.php?enews_key=101

CobraNet is a professional audio network system developed by Peak Audio, Inc (USA). CobraNet provides a technology using the standard Ethernet (registered trademark) protocol of IEEE802.3u in which uncompressed audio signals and control signals of multiple channels are transmitted through the Ethernet. This technology can transmit audio data having a sample rate of 48 kHz and bit width of 16, 20, and 24 bits, and can handle the audio signals and control signals in two directions, each having up to 64 channels (i.e., up to 128 channels in both directions). SuperMAC and EtherSound are similar technology for transmitting audio signals over the Ethernet.

Audio devices having a variety of functions such as analog input, analog output, digital input, digital output, mixing, effecting, recording/reproducing, remote control, and a combination of any two of these functions can be optionally connected to an audio network that uses the above technologies.

In any method of the various technologies that have been developed for transmitting audio signals through the network as described above, the maximum number of channels for transmitting audio signals through the network is determined based on the transfer rate of the network. Accordingly, even though the conventional technologies are designed to allow any audio devices to be connected to the network, if all the transmission channels are already in full use, additionally connected audio devices cannot communicate audio signals. Thus, actually, the conventional technologies limit the number of connectable audio devices.

Further, although a console for controlling the audio devices is essential for the network connecting the audio devices, the conventional technologies have not taken into consideration a process for backup at the occurrence of a malfunction of the console. One may consider that, when a malfunction has occurred in the console, a new console is connected to the network as a substitute for the console. However, connecting the substitute console to the network may not be permitted due to the limitation on the number of audio devices.

In the various audio devices, often, their setting states are stored as scene data, and the scene is recalled to be set in the audio devices through a simple manipulation. However, when a structure connecting the various audio devices to a network as described above is employed, there is no choice but to individually store and recall scene data for each device, and it is also difficult and inconvenient to manage the scene data.

SUMMARY OF THE INVENTION

It is an object of the invention to provide an audio network system which allows use of functions of additional audio devices exceeding the maximum number of transmission channels that is determined from the specifications of the network.

It is an object of the present invention to provide a technology for an audio network system capable of transmitting audio signals, that can continue operation and can also quickly provide a substitute console when a malfunction has occurred in a console of the system.

It is an object of the present invention to provide a technology for an audio network system capable of transmitting audio signals and convenient to manage the scene data even when a structure connecting various audio devices to a network is employed.

In order to achieve the objects, the invention provides an audio network system including a plurality of nodes each being capable of inputting, outputting or processing an audio signal. The inventive audio network system comprises a plurality of partial networks that can work independently from each other, each partial network connecting one or more of nodes for transmission of the audio signals thereamong by using transmission channels in time-divisional manner, said one or more of the nodes including a partial master node and a connection node, the partial master node controlling the transmission of the audio signals within the partial network, and a connection network capable of connecting respective connection nodes of the respective partial networks so as to connect the plurality of the partial networks with each other through the connection nodes, the connection network performing transmission of the audio signals by using transmission channels in time-divisional manner within the connection network, one of the connection nodes being a connection master node for controlling the transmission of the audio signals in the connection network. The connection node of the partial network operates when the audio signal is transmitted from the partial network to the connection network, for forwarding the audio signal from a transmission channel used for carrying the audio signal in the partial network to a transmission channel to be used for carrying the audio signal in the connection network, and operates when the audio signal is transmitted from the connection network to the partial network, for forwarding the audio signal from a transmission channel used for carrying the audio signal in the connection network to a transmission channel to be used for carrying the audio signal in the partial network. A desired number of nodes can be detachably connected to each partial network, and a desired number of connection nodes can be detachably connected to the connection network.

In one aspect of the invention, the audio network system further comprises a control device that performs a remote control of the plurality of the nodes involved in the audio network system which includes a first network and a second network connected with each other through the connection node, such that one of the first and second networks is a partial network and the other of the first and second networks is the connection network. In case that the control device is inputted with an instruction to transmit the audio signal from a first node of the first network to a second node of the second network, the control device performs: (1) allowing a master node of the first network to assign a first transmission channel for transmission of the audio signal from the first node to the connection node while allowing the first node to output the audio signal to the first transmission channel; (2) allowing a master node of the second network to assign a second transmission channel for transmission of the audio signal from the connection node to the second node while allowing the second node to receive the audio signal from the second transmission channel; and (3) allowing the connection node to receive the audio signal from the first transmission channel of the first network and then to output the audio signal to the second transmission channel of the second network.

Preferably, the control device can be logged in by a user having an authority associated with using and setting of at least one partial network, and the control device accepts the instruction to transmit the audio signal from the first node to the second node only when the user has the authority of setting both of a partial network involving the first node and another partial network involving the second node. The control device does not accept an instruction to change the setting of the transmission from the first node to the second node once the setting is established, when a user logging into the control device after the setting was established does not have an authority for setting either of the partial networks associated to the first node and the second node.

Preferably, the control device is connected to a node which is connected to both the first network and the second network to perform the remote control via the node. Alternatively, the control device is connected to at least one of the first network and the second network to perform the remote control.

In another aspect of the invention, the inventive audio network system further comprises a console connected to a partial network for controlling each node of the partial network, such that each node connected to the partial network operates according to an instruction from the console of the partial network. When the console becomes absent on the partial network, another console on another partial network connected through the connection network is allowed to operate as the console of the partial network.

Alternatively, the inventive audio network system further comprises one or more of consoles connected to a partial network for controlling each node of the partial network, one of the consoles operating as a master console of the partial network, such that each node connected to the partial network operates according to an instruction from the console that operates as the master console of the partial network. When the master console becomes absent on the partial network, another console on the partial network is allowed to operate as the master console if said console is present on the partial network, and an console on another partial network connected through the connection network is allowed to operate as the master console of the partial network if no other console is present on the partial network.

In a further aspect of the invention, a node on each partial network includes storage means for storing a plurality of presets, each preset including setting information of the partial network. The audio network system further comprises a control device that operates when a user has issued an instruction to recall a scene associated to a partial network, for reading a preset corresponding to the scene stored in the storage means of the partial network and setting each node of the partial network according to the read preset, and the control device operates when a user has issued an instruction to recall a scene associated to a plurality of partial networks, for reading a preset corresponding to the scene stored in the storage means of each of the plurality of the partial networks and setting each node of the plurality of the partial networks according to the read presets.

Preferably, in case that the read preset includes transmission of the audio signal over two of the plurality of the partial networks, the control device sets a connection transmission channel for performing the transmission of the audio signal between the connection nodes of the two partial networks under control of the connection master node.

Preferably, the control device accepts the instruction to recall the scene of the two or more partial networks if a user having an authority to perform setting of the two or more partial networks inputs the instruction to the control device.

The present invention allows audio signals to be transmitted between partial networks, thereby realizing an audio network system which allows use of functions of extra audio devices in addition to the maximum number of transmission channels of audio signals that is determined from the specifications of each partial network.

According to the invention, when a malfunction has occurred in a console of an audio network system capable of transmitting audio signals, the system can quickly provide a substitute console. Even at the moment when the malfunction occurs, each node continues operation and thus its operation as an audio device is not interrupted.

According to the invention, even when a structure connecting various audio devices to a network is employed in an audio network system capable of transmitting audio signals, it is not necessary to individually store and recall the scene data for each device, and it is also easy and convenient to manage the scene data.

BRIEF DESCRIPTION OF THE DRAWINGS

FIG. 1 illustrates a detailed configuration of a node device such as a mixing engine, and a console connected to a node device.

DETAILED DESCRIPTION OF THE INVENTION

Figure 2:
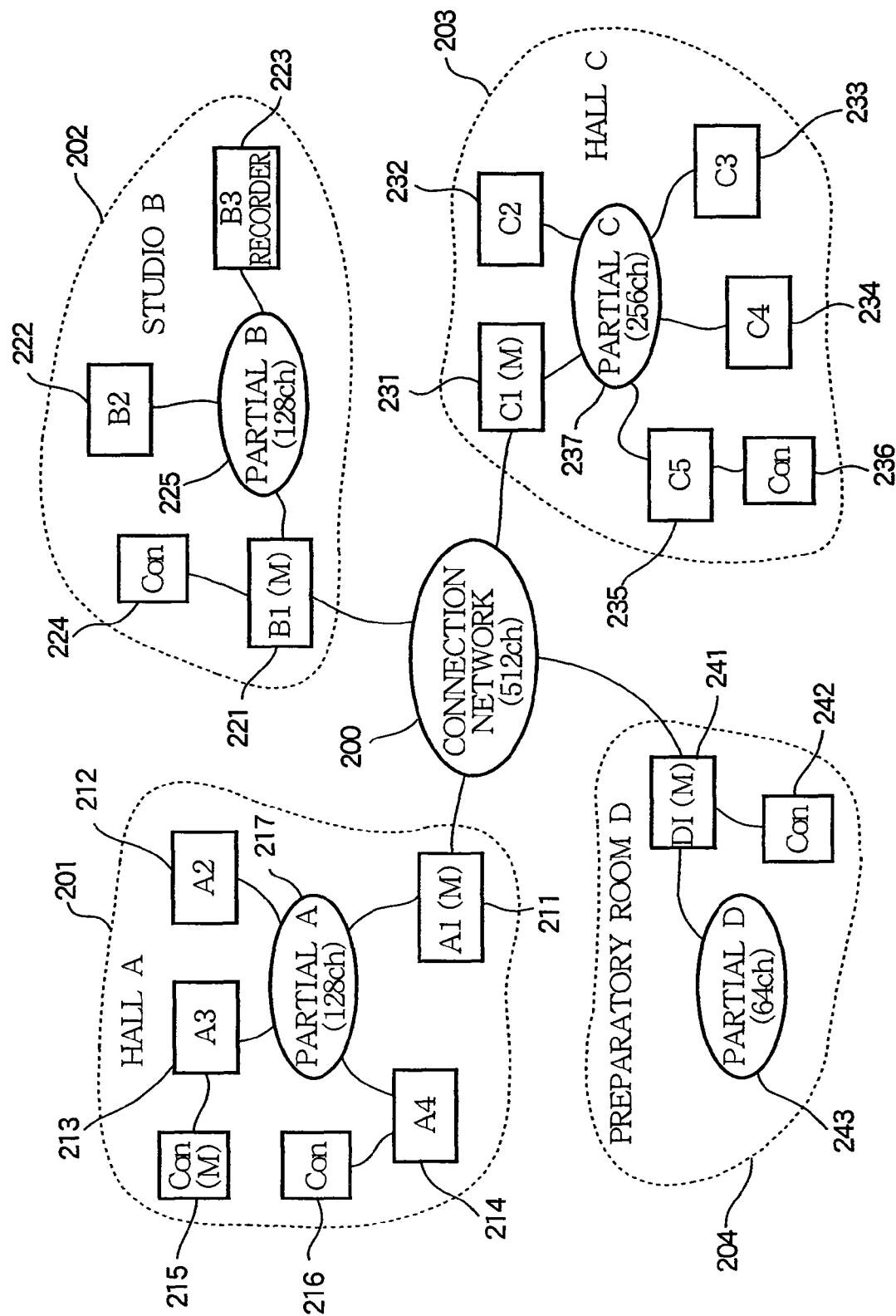
FIG. 2 illustrates an example overall configuration of an audio network system according to an embodiment of the present invention.

Embodiments of the present invention will now be described with reference to the accompanying drawings.

FIG. 1 illustrates a detailed configuration of a node 100 of a device such as a mixing engine and a console 130 connected to the device in an audio network system according to an embodiment of the invention. The node 100 of the device such as a mixing engine includes a central processing unit (CPU) 101, a flash memory 102, a random access memory (RAM) 103, a communication input/output interface (COM I/O) 104, a card input/output interface (I/O) unit 105, a signal processor (DSP) 106, a partial network interface (Net I/O) 107, and a bus line 109. A connection network interface (Net I/O) 108 will be described later.

The CPU 101 is a processing device that controls overall operations of the device of the node 100. The flash memory 102 is a nonvolatile, rewritable storage device that stores programs to be executed by the CPU 101, a variety of data, and the like. The RAM 103 is a volatile memory into which a program to be executed by the CPU 101 is loaded or which is used as a variety of work areas. The COM I/O 104 is an interface connected to a communication cable for communication with the console 130 or other device such as a PC.

The card I/O unit 105 is a unit that has a plurality of card slots (card insertion holes). Examples of the cards for insertion include a DSP card that performs signal processing such as mixing of digital audio signals, an analog input card that receives and converts analog audio signals into digital audio signals, an analog output card that converts digital audio signals into analog audio signals and outputs the analog audio signals, and a digital I/O card that performs input and output operations of digital audio signals. The type of cards (which may include different types of cards) inserted in the card I/O unit 105 determines the functions of the device of the node 100. For example, when DSP cards are inserted in all the slots, this node becomes a node of a mixer that mainly performs signal processing such as mixing of audio signals. In addition, when analog or digital I/O cards are inserted, the node 100 becomes a node that performs input/output operations of analog or digital signals. FIG. 1 shows an example where a DSP card A, a DSP card B, an analog input (Ain) card C, and an analog output (Aout) card D are inserted in the slots 111 to 114 to accomplish analog signal input/output and mixing processes using only the device of the node 100. Although only four slots 111 to 114 are illustrated, it is possible to design any number of slots. Reference numeral "115" denotes a signal bus through which audio signals are exchanged between the cards inserted in the slots. "116" denotes a control bus through which control signals are exchanged.

The DSP 106 mainly performs a function to control exchange of audio signals between the cards inserted in the card I/O unit 105 and the Net I/O 107. Particularly, when performing communication of signals with a device of another node through a partial network which will be described in detail later, it is necessary to comply with a protocol specified in the partial network. Processes such as control of signal input and output timings and processing of signals according to the protocol are performed by a cooperation of the DSP 106 and the Net I/O 107. The Net I/O 107 is an interface for connecting this device to the partial network.

As will be described in detail later with reference to FIG. 2, the network system of this embodiment includes a connection network for connecting a plurality of partial networks with each other. Reference numeral "108" denotes a connection network interface (connection Net I/O) that is included in the node 100 when the node 100 is a node (hereinafter referred to as a connection node) which connects the partial network and the connection network. The connection Net I/O 108 is unnecessary when the node 100 is connected to the partial network and is not connected to the connection network. Although the Net I/Os 107 and 108 are interfaces of the same communication scheme in this example, they may be of different communication schemes. The DSP 106 and the Net I/Os 107 and 108 may also be implemented as communication cards that are inserted in the slots 111 to 114.

The console 130 includes a CPU 131, a flash memory 132, a RAM 133, a display unit 134, operators 135, electric faders 136, a COM I/O 137, a DSP 138, an audio I/O 139, and a bus line 140. The CPU 131 is a processing unit that controls overall operations of the console 130. The flash memory 132 is a storage device that stores programs to be executed by the CPU 131, a variety of data, and the like. The RAM 133 is a volatile memory which is used as a program load area or a variety of work areas. The display unit 134 is a display that is mounted on an external panel of the console 130 to display a variety of information. The electric faders 136 are operators that are mounted on the external panel of the console 130 to set a variety of parameter values. The operators 135 are a variety of operators mounted on the external panel of the console 130. The COM I/O 137 is an interface connected to a communication cable for allowing this console 130 to communicate with the node 100 such as a mixing engine. The DSP 138 performs a variety of processes for receiving signals that are input and output through the COM I/O 137. The audio I/O 139 is an input/output interface for monitoring audio signals or the like.

FIG. 2 illustrates an example overall configuration of the audio network system of this embodiment. Nodes 211 to 214 and consoles 215 and 216 are installed as audio equipment of a hall A201. Each of the nodes 211 to 214 is a device having the same configuration as that of the above-mentioned node 100 of FIG. 1. Each of the nodes 211 to 214 performs specific audio processing functions through specific cards inserted in each of the nodes 211 to 214. The nodes 211 to 214 are connected to each other through a partial network A217 to construct as a whole a mixer system in the hall A201. The functional configuration of the mixer system constructed as a whole in the hall A201 will be described with reference to FIG. 4. The nodes 211 to 214 will now be denoted by "A1" to "A4" to indicate that they are nodes of the partial node A. One of a plurality of nodes connected to each partial network serves as a master node of the partial network to perform audio signal transmission control in the partial network such as transmission cycle timing control, transmission resource allocation, and the like. The master node stores and manages configuration information of each device connected to the partial network. The configuration information includes information of which nodes are connected to the partial network, information of which cards are inserted into a device of each node, information of which nodes are connected to consoles, and the like. Symbol "A1(M)" attached to the node 211 indicates that the node A1 is a master node of the current partial network A. Cards which may be inserted into the slots of the node 100 include a card the function of which has been determined such as an analog input card and a multifunctional card such as a DSP card that can be used for any of a mixer, an effector, and an insertion portion. However, it is assumed herein that one function has been determined for each card by setting it through DIP switches or the like or by setting it through an installation operation when inserting the card.

Reference numeral "215" denotes a console (Con) that is connected to the node A3 and "216" denotes a console that is connected to the node A4. When a plurality of consoles is connected in a mixer system constructed of devices of nodes connected to one partial network, one of the consoles is set as a master and the other consoles are set as slaves. In the mixer system A of the partial network A of FIG. 2, the console 215 is a master console. To indicate this, the console 215 is denoted by "Con(M)" in FIG. 2. Four mixer systems are constructed in association respectively with four partial networks A to D in FIG. 2. As will be described later, each mixer system can use as its components not only devices connected to a corresponding partial network but also devices of another partial network connected to the connection network. A plurality of devices which constructs each mixer system is controlled by a control signal from its master console. That is, each master console controls the entirety of a mixer system constructed on a corresponding partial network. Each slave console can transfer a setting operation performed using its operating panel to a corresponding master console (Extension of Operating Panel of Master Console). In addition, the slave console can receive a variety of instruction signals output from the master console to perform the same operations as those internally performed by the master console and, when some error occurs in operations of the master console, the slave console can be raised to the status of the master console to take over the operations of the master console (Buffering of Master Console).

Similarly, nodes 221 to 223 (B1 to B3) and a console 224 are installed as audio equipment of a studio B202. Devices of these nodes B1 to B3 are connected to a partial network B225 to construct as a whole a mixer system in the studio B202. The node B3 is set as a recorder that can perform digital recording of audio signals. The console 224 is a master console since it is the only console in the mixer system constructed on the partial network B. Similarly, nodes 231 to 235 (C1 to C5) and a console 236 are installed as audio equipment of a hall C203 to construct a mixer system on a partial network C. In addition, a node 241 (D1) and a console 242 are installed as audio equipment of a Preparatory Room D204 to construct a mixer system on a partial network D.

The connection network 200 is a higher network for connecting the partial networks A, B, C, and D to each other. The connection network 200 is connected to the master node A1(M) of the partial network A, the master node B1(M) of the partial network B, the master node C1(M) of the partial network C, and the master node D1(M) of the partial network D. These nodes A1(M), B1(M), C1(M), and D1(M) are connection nodes from the viewpoint of the fact that they are connected to the connection network 200. The master nodes of the partial networks are not necessarily set as the connection nodes. However, when the master nodes of the partial networks are set as the connection nodes, it is possible to achieve more stable transmission of audio signals in each partial network since the master nodes determine communication timings of the partial networks. One of the connection nodes, for example the node B1(M), is set as a master node of the connection network 200, which will be referred to as a connection master, to perform transmission control of audio signals in the connection network such as transmission cycle timing control, transmission resource allocation, and the like. The connection master is a node that performs communication control in the connection network such as allocation of transmission resources used for transmission of audio signals through the connection network 200.

Although the partial and connection networks may use the same or different protocols since they are networks independent of each other, it is assumed herein that the partial and connection networks use a protocol that can transmit audio signals of a specific number of channels on a time division basis in almost real time and can also transmit control signals on a time division basis at the same time. The partial and connection networks may use any of a variety of conventional methods for transmitting audio signals, for example, mLAN (registered trademark), CobraNet (registered trademark), and HyperMAC (registered trademark).

Figure 3:
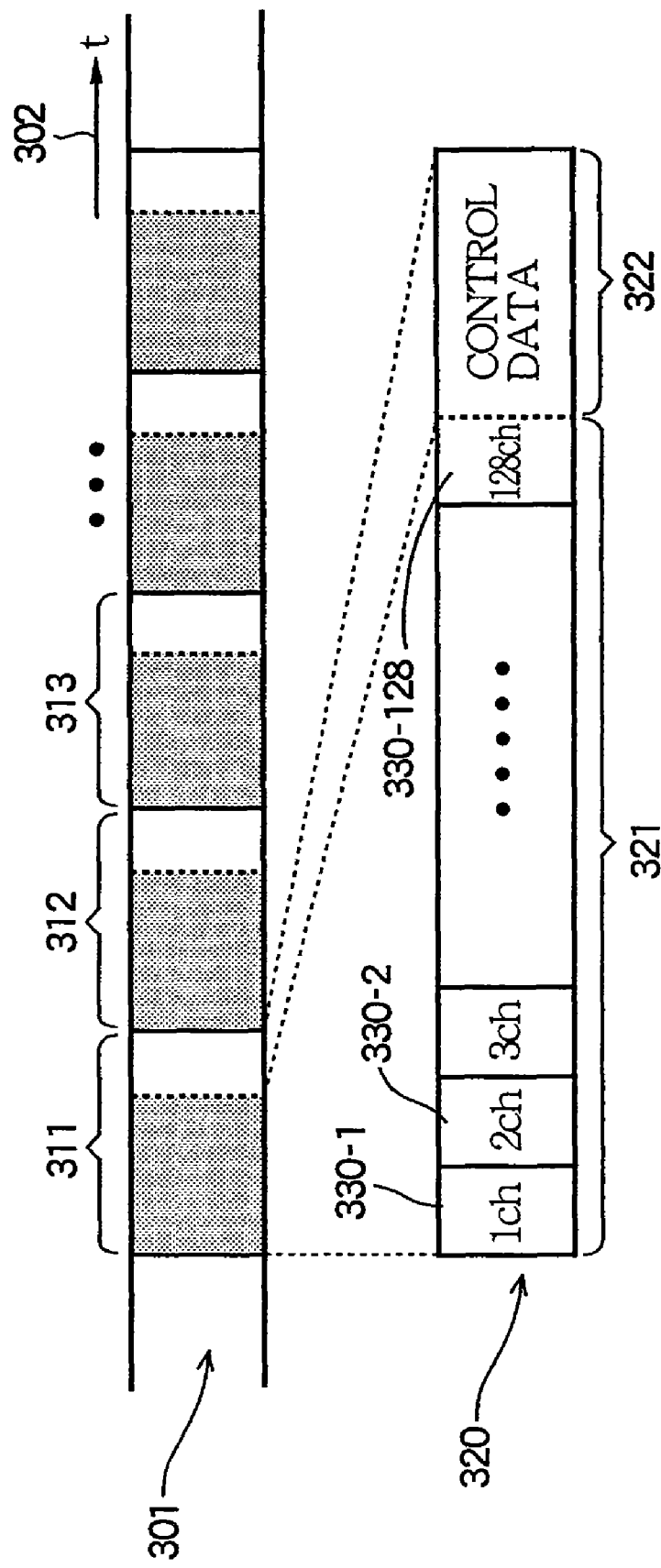
FIG. 3 illustrates an example transmission format used in partial networks and connection network of the inventive network system.

FIG. 3 illustrates an example transmission format in partial and connection networks in the system of this embodiment. Reference numeral "301" denotes transmission frames 311, 312, 313, . . . which are sequentially transmitted as time "t" (denoted by arrow "302") passes. One frame has a fixed length of, for example, about tens to hundreds of micro seconds. It is desirable that the frame length be a sampling period of sampling clocks used in the system times "n" which is an integer equal to or greater than 1. In this case, a master node of each network also operates as a word clock master that determines a sampling clock of audio signals in the network. A front portion 321 of one frame is a time interval that is assigned for transmission of audio signals (music waveform samples) of a specific number of channels. FIG. 3 shows an example format which has a front portion 321 divided into time intervals 330-1 to 330-128 and thus can transmit audio signals of 128 channels. Each of the time intervals 330-1 to 330-128 corresponds to one transmission channel. One waveform sample or a specific number of waveform samples can be set in one transmission channel, for example in the time interval 330-1. One transmission channel is used to transmit audio signals corresponding to one channel. The number of transmission channels that can be assigned and the number of waveform samples that can be included in the intervals of the channels in one frame may be determined arbitrarily according to required specifications of the network. When the number of transmission channels is set to be large and the number of samples that can be transmitted through one frame is set to be large, a network band corresponding to the large numbers of transmission channels and samples is required so that high-performance hardware is required. A rear-side time interval 322 of one frame is allocated to transmit control data.

Using the transmission format as shown in FIG. 3 as a basic format, the partial networks A, B, C, and D can be designed to be able to use, for example, 128 channels, 128 channels, 256 channels, and 64 channels, respectively, as shown in FIG. 2. In addition, the connection network 200 can be designed to use 512 transmission channels. That is, of the networks, the connection network 200 has the largest band, the partial networks A and B have the next largest band, and the partial network D has the smallest band.

Transmission channels of each network are assigned under control of a master node of the network. For example, when a first node in the partial network A desires to transmit an audio signal to a second node, the first or second node which desires to perform this communication requests the master node A(M) to assign a transmission channel and the master node A(M) then assigns one of the transmission channels 330-1 to 330-128 of FIG. 3 in response to the request and notifies the requesting node of the assigned transmission channel. When the requesting node is the first node, the first node notifies the second node of the transmission channel to be used and, when the requesting node is the second node, the second node notifies the first node of the transmission channel. The transmitting-side first node then outputs the audio signal to the partial network A by incorporating it into the transmission channel. The receiving-side second node receives the audio signal through the transmission channel of the network A. The same processes for assigning a transmission channel and transmitting an audio signal using the transmission channel are performed when connection nodes communicate with each other through the connection node 200.

Although the example format illustrated in FIG. 3 transmits audio and control signals on a time division basis, audio and control signals may be transmitted separately through separately installed network lines for audio and control signals.

Figure 4:
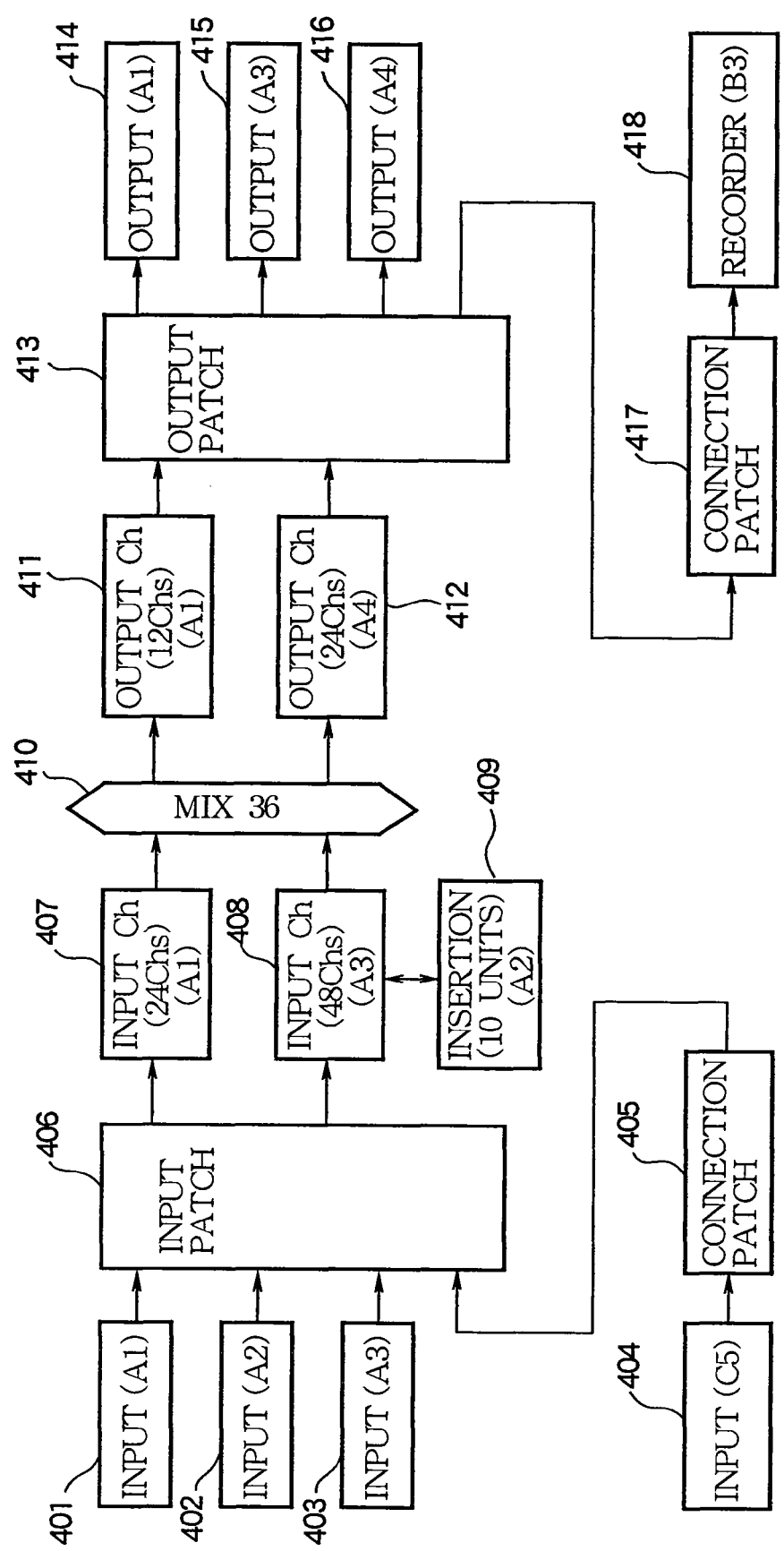
FIG. 4 is a block diagram illustrating a functional configuration of a mixer system that is constructed by node devices of partial networks.

FIG. 4 is a block diagram illustrating a functional configuration of the mixing system that the devices of the nodes A1 to A4 of the partial network A of FIG. 2 construct as a whole. Reference numerals 401 to 403 denote input units of audio signals. An input patch 406 performs arbitrary line connection for inputting input signals received through the input units 401 to 403 to input channels of an input channel portion 407 including 24 channels and an input channel portion 408 including 48 channels. Each input channel of the input channel portions 407 and 408 can perform a variety of signal processing such as equalization and dynamics. Signals of each input channel of the input channel portions 407 and 408 can be selectively output to arbitrary mixing buses of a MIX bus portion 410 including 36 mixing buses MIX1 to MIX36. Each mixing bus of the MIX bus portion 410 can mix signals input from the input channel portions 407 and 408. Signals mixed on each mixing bus of the MIX bus portion 410 are output to an output channel corresponding to the mixing bus, i.e., to one output channel of output channel portions 411 and 412. Outputs of the output channel portions 411 and 412 are output to an output patch 413. The output patch 413 performs arbitrary line connection of output channels of the output channel portions 411 and 412 to an output system. Reference numerals "414" to "416" denote audio signal output units. An insertion portion 409 performs a function to extract a signal from one input channel of the input channel portion 408 and perform a variety of effects processes on the extracted signal using a DSP and then to return the processed signals to the input channel of the input channel portion 408.

Symbols "A1", "A2", "A3", and "A4" in parentheses attached to some blocks in FIG. 4 illustrate which nodes realize functions of the blocks in the partial network A of FIG. 2. For example, since "A1" in parentheses is attached to the input unit 401, it can be seen that the function of the input unit 401 is implemented by the node A1 of the partial network A of FIG. 2. Similarly, the node A1 realizes the functions of the input channel portion 407, the output channel portion 411, and the output unit 414. The node A2 realizes the functions of the input unit 402 and the insertion portion 409 (including 10 units). The node A3 realizes the functions of the input unit 403, the input channel portion 408, and the output unit 415. The node A4 realizes the functions of the output channel portion 412 and the output unit 416. Any of the nodes which perform the functions of the input units 401 to 403 has a slot in which an audio signal input card is inserted. Any of the nodes which perform the functions of the output units 414 to 416 has a slot in which an audio signal output card is inserted. Any of the nodes which perform the functions of the input channel portions 407 and 408 and the output channel portions 411 and 412 has a slot in which a DSP card is inserted. FIG. 4 does not illustrate which devices realize the functions of the other blocks (i.e., the input patch, the output patch, the buses, and the connection patch) since these functions are implemented by individually assigning them to nodes or networks for each line through which an audio signal passes.

In addition, the audio network system of this embodiment allows an audio system constructed on one partial network to use functions of nodes of another partial network. For example, the audio system of the partial network A uses the function of the input unit 404 of FIG. 4 although this function is implemented by the node C5 installed in the hall C. Exchange of audio signals between a node of the partial network A and the node C5 of the partial network C is performed through the partial network A, the connection network 200, and the partial network C. The connection patch 405 indicates line connection through the connection network 200. Similarly, line connection of output signals of specific output channels to a recorder unit 418, which is implemented by the node B3 of the partial network B, is performed through the output patch 413 and the connection patch 417. Similarly, an audio system constructed on one partial network can use functions of any blocks, other than the input and output units, of nodes of another partial network.

The input patch 406 of FIG. 4 will now be described in detail. Although the input patch 406 is a functional block that performs line connection between any input port of the input units 401 to 404 and any input channel of the input channel portions 407 and 408, the input patch 406 is not necessarily implemented by one node. The cases where line connection is performed are divided into three cases: (1-1) line connection is performed within one node in the same partial network; (1-2) line connection is performed between different nodes in the same partial network; and (1-3) line connection is performed between nodes of different partial networks. The three cases are described below.

(1-1) As an example of the case where line connection is performed within one node in the same partial network, there is presented a case where the master console 215 is operated to perform line connection from one input signal received through one input port of the input unit 401 to one input channel of the input channel portion 407, i.e., where signal transfer is performed within the same node A1. When it is assumed in the configuration of FIG. 1 that the Ain card C inserted in the slot 113 corresponds to the input unit 401 and the DSP card A inserted in the slot 111 corresponds to the input channel portion 407, line connection of the input patch 406 is implemented in the following manner. According to an instruction of the master console 215, the CPU 101 of the node A1 assigns a B transmission channel of the signal bus 115 (including a transmission frame, a transmission band, a time slot, and the like) and sets the Ain card C so as to transmit the signal of the input unit 401 to the signal bus 115 using the assigned B transmission channel, and the CPU 101 of the node A1 sets the DSP card A so as to receive the transmitted signal from the signal bus 115 and then to provide the received signal to a process of a corresponding channel in the input channel portion 407 that is running in the node A1.

(1-2) As an example of the case where line connection is performed between different nodes in the same partial network, there is presented a case where the master console 215 is operated to perform line connection from one input signal received through one input port of the input unit 401 to an input channel of the input channel portion 408, i.e., where a signal is transferred from the node A1 to the node A3 using a transmission channel of the partial network A. In this case, when a line connection instruction is issued, the master console 215 of the partial network A allows the node A1, which is a master node, to assign an NA transmission channel (including a transmission frame, a transmission band, a time slot, and the like) and instructs the transmitting-side node A1 to transmit the signal of the input unit 401 to the partial network A using the assigned NA transmission channel and the master console 215 of the partial network A instructs the receiving-side node A3 to receive the transmitted signal and provide it to a process of a corresponding channel in the input channel portion 408. When the node A1 has received the instruction, the CPU 101 in the node A1 assigns a B transmission channel of the signal bus 115 and sets the Ain card C and the DSP 106 so as to transmit the signal of the input unit 401 to the DSP 106 using the B transmission channel and sets the DSP 106 and the Net I/O 107 so as to transmit the signal to the partial network A using the NA transmission channel. Here, let us assume that the DSB card B that runs the input channel portion 408 is inserted in the slot B. Then, when the node A3 has received the instruction, the CPU 101 in the node A3 sets the DSP 106 and the Net I/O 107 so as to receive the transmitted signal from the partial network A and then assigns a B transmission channel of the signal bus 115 and sets the DSP 106 and the DSP card B so as to transmit the received signal from the DSP 106 to the DSP card B using the B transmission channel. Line connection from the input port of the Ain card C (i.e., the input unit 401) of the node A to a process of a corresponding channel in the input channel portion 408 of the DSP card B of the node A3 is implemented in the above manner.

(1-3) As an example of the case where line connection is performed between nodes of different partial networks, there is presented a case where the master console 215 is operated to perform line connection from one input signal received through one input port of the input unit 404 to an input channel of the input channel portion 408, i.e., where a signal is transferred from the node C5 to the node A3. In this case, when a line connection instruction is issued, the master console 215 of the partial network A allows the master node A1 to assign an NA transmission channel of the partial network A, the master node C1 to assign an NC transmission channel of the partial network C, and the connection master B1 to assign an NI transmission channel of the connection network. The master console 215 then instructs the transmitting-side node C5 to transmit the signal of the input unit 404 to the partial network C using the assigned NC transmission channel and instructs the node C1(M), which relays the signal, to receive the signal and then to transmit it to the partial network A using the assigned NA transmission channel and then instructs the receiving-side node A3 to receive and provide the signal to a process of a corresponding channel of the input channel portion 408. When the node C5 has received the instruction, the CPU 101 in the node C5 assigns a B transmission channel and sets the Ain card, the DSP 106, and the Net I/O 107 to transmit the signal from the input unit 404 to the DSP 106 and then to transmit the signal to the partial network C using the NC transmission channel. When the node C1(M) has received the instruction, the CPU 101 in the node C1(M) sets the Net I/O 107, the DSP 106, and the Net I/O 108 to receive the signal from the partial network C and then to transmit the signal to the connection network using the NI transmission channel. When the node A1(M) has received the instruction, the CPU 101 in the node A1(M) sets the Net I/O 108, the DSP 106, and the Net I/O 107 to receive the signal from the connection network and then to transmit the signal to the partial network A using the NA transmission channel. When the node A3 has received the instruction, the CPU 101 in the node A3 sets the Net I/O 107, the DSP 106, and the DSP card to receive the signal from the partial network A and then to transmit the signal from the DSP 106 to the input channel portion 408. Line connection from the port of the input unit 404 of the node C5 to a port of a corresponding channel in the input channel portion 408 that is running in the node A3 is implemented in the above manner along a path of node C5→(partial network C)→connection node C1(M)→(connection network)→connection node A1(M)→(partial network A)→node A3.

As described above, the connection node of the partial network operates when the audio signal is transmitted from the partial network to the connection network, for forwarding (passing) the audio signal from a transmission channel used for carrying the audio signal in the partial network to another transmission channel to be used for carrying the audio signal in the connection network, and operates when the audio signal is transmitted from the connection network to the partial network, for forwarding (passing) the audio signal from a transmission channel used for carrying the audio signal in the connection network to another transmission channel to be used for carrying the audio signal in the partial network. Stated otherwise, the connection node operates when the audio signal is transmitted from the partial network to the connection network, for switching a transmission channel used for carrying the audio signal in the partial network to another transmission channel to be used for carrying the audio signal in the connection network, and operates when the audio signal is transmitted from the connection network to the partial network, for switching a transmission channel used for carrying the audio signal in the connection network to another transmission channel to be used for carrying the audio signal in the partial network.

In the case (1-3), transmission in the partial network C is unnecessary if the input unit 404 is implemented by the connection node C1(M) rather than the node C5. Similarly, transmission in the partial network A is unnecessary if the input channel portion 408 is implemented by the connection node A1(M) rather than the node A3.

The user can arbitrarily perform the above-mentioned line connection setting for the input patch 406 while viewing a specific screen on the console. According to a line connection setting instructed by the user, the console instructs CPUs 101 of nodes needed in each of the above-mentioned cases (1-1) to (1-3) to load microprograms into DSPs 106 of the nodes. The microprograms include microprograms that cause the nodes to run their DSPs 106 to implement the above operations in the cases (1-1) to (1-3).

The MIX bus portion in FIG. 4 will now be described in detail. A mixing process on each mixing bus of the MIX bus portion 410 is performed by the same DSP card of the same node as that which performs processes of an output channel corresponding to the bus in order to minimize a setting change process required when changing the routing from an input channel to a mixing bus. For example, a mixing result of the first of the 36 mixing buses of the MIX bus portion 410 is output to the first output channel of the output channel portion 411, a mixing result of the second of the 36 mixing buses of the MIX bus portion 410 is output to the second output channel of the output channel portion 411, and so on. Accordingly, the cases where routing from an input channel to a mixing bus is implemented are divided according to which node implements the input channel, which mixing bus receives the signal of the input channel, and which node implements the mixing bus in the same manner as described above with the input patch 406. That is, the cases where the routing is implemented are divided into three cases: (2-1) the input channel portion, the MIX bus portion, and the output channel portion are implemented within one node in the same partial network; (2-2) the input channel portion is implemented in a first node of the same partial network and the MIX bus portion and the output channel portion are implemented in a second node thereof; and (2-3) the input channel portion is implemented in a node of a first partial network and the MIX bus portion and the output channel portion are implemented in a second partial network different from the first partial network. The three cases are described below. In order to reduce consumption of transmission resources of the network and transmission buses, part of the mixing process of each bus may be performed by the same DSP card of the same node as that of an input channel portion which outputs a signal to the bus.

(2-1) As an example of the case where the input channel portion, the MIX bus portion, and the output channel portion are implemented within one node in the same partial network, there is presented a case where the master console 215 is operated (i.e., a MIX1 Send button of the first input channel is turned on) to output a signal of the first input channel of the input channel portion 407 to the first mixing bus MIX1, i.e., where routing from an input channel to a mixing bus is performed within the same node A1. When it is assumed in the configuration of FIG. 1 that the DSP card A inserted in the slot 111 corresponds to the input channel portion 407, the DSP card B inserted in the slot 112 corresponds to the mixing bus MIX1 and the output channel portion 411, routing from the first input channel to the first mixing bus is implemented in the following manner. The CPU 101 assigns a B transmission channel of the signal bus portion 115 and sets the DSP card A so as to transmit a resulting signal of the processing of the first input channel to the signal bus portion 115 using the assigned B transmission channel and sets the DSP card B so as to receive the transmitted signal from the signal bus portion 115 and then to provide the signal to a process of the processing of the first mixing bus (and the first output channel) that is running internally. When processes of the first mixing bus MIX1 and the first output channel (together with the process of the first input channel) are performed in the DSP card A, it is only necessary to perform setting for routing from the first input channel to the first mixing bus MIX1 in the DSP card A and it is unnecessary to perform setting for signal transfer between cards through the signal bus portion 115. In the above manner, the output signal of the first input channel is input to the process of the first mixing bus MIX1. The first mixing bus MIX1 mixes the input signal with another input signal and outputs the mixed signal to a process of the first output channel.

(2-2) As an example of the case where the input channel portion is implemented in the first node of the same partial network and the MI bus portion and the output channel portion are implemented in the second node, there is presented a case where the master console 215 is operated (i.e., a MIX13 Send button of the first input channel is turned on) to output a signal of the first input channel of the input channel portion 407 to the 13th mixing bus MIX13, i.e., where routing from an input channel of the node A1 to a mixing bus of the node A4 is performed. In this case, when an instruction to perform setting for this routing is issued, the master console 215 assigns an NA transmission channel to the node A1 that is a master node and instructs the transmitting-side node A1 to transmit the signal of the first input channel to the partial network A using the assigned NA transmission channel and also to instruct the receiving-side node A4 to receive the transmitted signal and then to provide the signal to a process of the 13th mixing bus MIX13. When the node A1 has received the instruction, the CPU 101 in the node A1 assigns a B transmission channel of the signal bus 115 and sets the Ain card Ca and the DSP 106 so as to transmit the signal of the input channel 407 to the DSP 106 using the B transmission channel and also sets the DSP 106 and the Net I/O 107 to transmit the signal to the partial network A using the NA transmission channel. Here, let us assume that the DSB card B that runs the 13th mixing bus MIX13 and the 13th output channel is inserted in the slot B. Then, when the node A4 has received the instruction, the CPU 101 in the node A4 sets the DSP 106 and the Net I/O 107 so as to receive the transmitted signal from the partial network A and then assigns a B transmission channel of the signal bus portion 115 and sets the DSP 106 and the DSP card B so as to transmit the received signal from the DSP 106 to the DSP card B using the B transmission channel. In this manner, the output signal of the first input channel of the node A1 is input to the process of the 13th mixing bus MIX13. The 13th mixing bus MIX13 mixes the input signal with another input signal and outputs the mixed signal to the 13th output channel.

(2-3) As an example of the case where the input channel portion is implemented in a node of a first partial network and the MIX bus portion and the output channel portion are implemented in a second partial network different from the first partial network, there is presented a case where the master console 215 is operated (i.e., a MIXb04 Send button of the 25th input channel is turned on) to output a signal of the 25th input channel of the input channel portion 408 that is implemented by the node A3 of the partial network A to a b04th mixing bus MIXb04 that is implemented by the node B2 of the partial network B, i.e., where routing from the input channel of the node A3 to the mixing bus of the node B2 is performed. The configuration shown in FIG. 4 is not applied in this case. This case is basically similar to the case (2-2). However, this case differs from the case (2-2) in that signal transmission is performed through the connection network. The signal transmission through the connection network is similar to that described above in the example of (1-3) of the input patch 406.

Although the user can perform operations for setting for the input patch and the routing in the mixer system A described above while viewing a specific screen on the master console 215, they can also perform the same setting operations on the slave console 216. However, when the user performs the setting operations on the slave console 216, the slave console 216 does not control the mixer system A and, instead, a setting operation performed on the slave console 216 is transferred to the master console 215 through the partial network A and the master console 215 controls the mixer system A according to the setting operation. That is, the master console A controls the mixer system A, regardless of the console on which the user performs setting operations.

Although the above description has been given of the input patch 406 and the MIX bus portion 410, signal transfer of the output patch 413 is similar to that of the input patch 406 and signal transfer between the input channel portion 408 and the insertion portion 409 is also similar to that of the input patch 406.

In the audio network system of this embodiment, mixer systems (audio systems) constructed of partial nodes exchange audio or control signals with each other through connection nodes, thereby achieving expansion of a variety of functions. For example, in the configuration of FIG. 2, there may be a desire to reproduce sound that is recorded in a recorder when a performance is played to generate the sound in the hall A. Conventionally, it is necessary to take a recorder to the hall A and then to connect the recorder to the partial network A or to one of the devices of the nodes connected to the partial network A. In the system of this embodiment, the recorder 223 of the node B3 is connected to the partial network B of the studio B202. Accordingly, under the control of, for example, the console 215 of the system of the partial network A, the sound reproduced by the recorder 223 of the node B3 can be received from the recorder 223 along a path of the partial network B, the master node B1 of the partial network B, the connection network 200, the master node A1 of the partial network A, and the partial network A. The master node A1 can output audio signals of the reproduced sound received from the recorder 223 to any output device. This allows function expansion to make it possible to use the system of the hall A without additionally connecting a recorder to the partial network A.

Similarly, function expansion is performed using the connection network in a variety of scenes. For example, when the mixer system of the hall A alone does not provide sufficient resources, the mixer system of the hall A operates in combination with the functions of the mixer system of the studio B or the hall C, thereby performing processes as if it is a high performance mixer. In addition, when a concert is performed in the hall A, its recording can be performed by the recorder 223 in the studio B.

Figure 5:
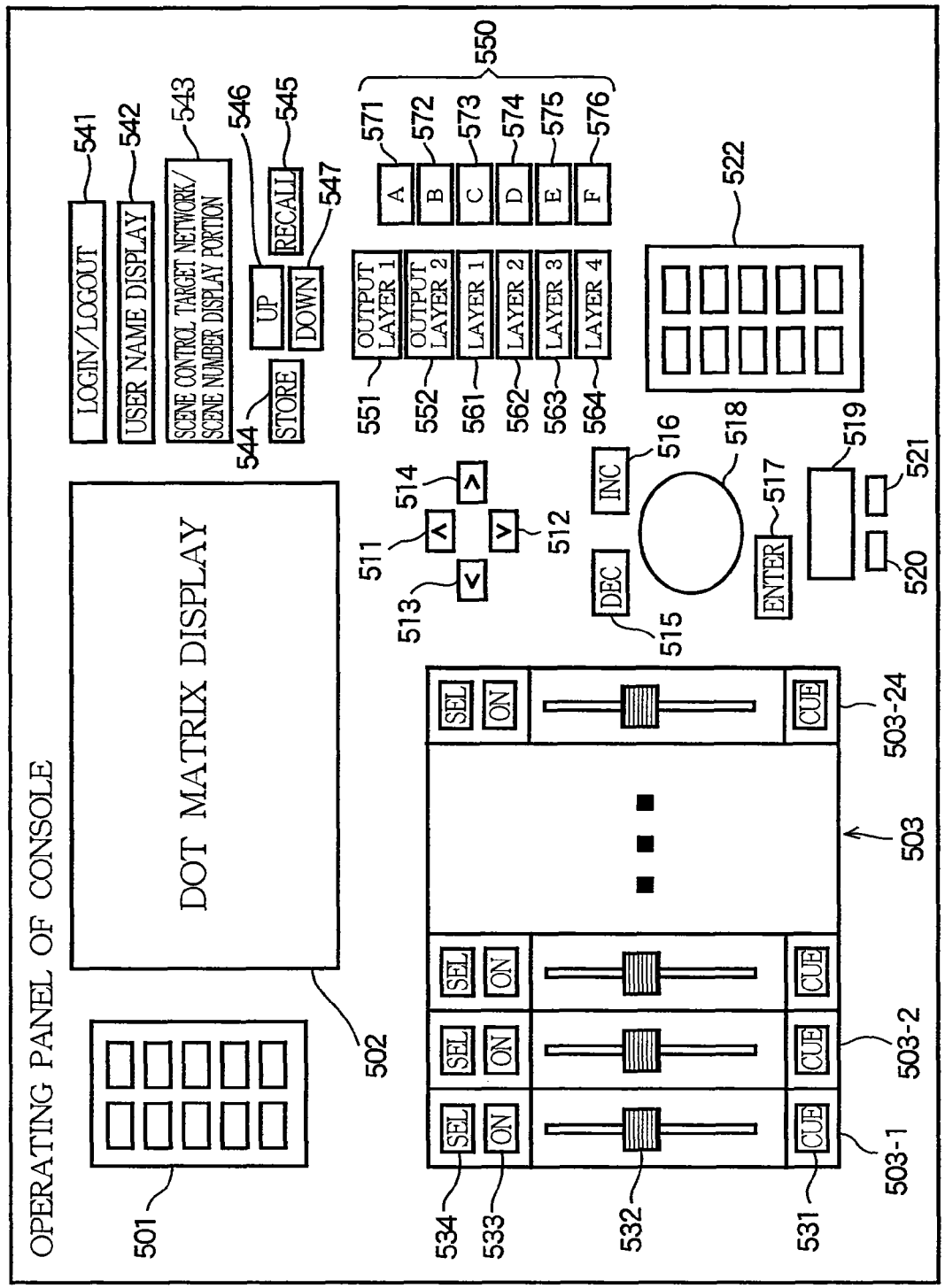
FIG. 5 shows an external appearance of an operating panel of a console that is used in an audio system of the partial network.

FIG. 5 shows an external appearance of the operating panel of the console 215 that is used in the audio system of the partial network A of FIG. 4. Reference numeral "501" denotes 10 screen selection switches, "502" denotes a dot matrix display, "503" denotes an assigned channel strip portion, "511" to "514" denote up, down, left, and right cursor moving buttons, "515" denotes a DEC button, "516" denotes an INC button, "517" denotes an enter key, "518" denotes a wheel, "519" denotes a touchpad, "520" denotes a left button, and "521" denotes a right button. The assigned channel strip portion 503 includes 24 assigned channel strips 503-1 to 503-24. One assigned channel strip (for example, 503-1) includes a CUE switch 531, an electric fader 532, an ON switch 533, and a selection (SEL) switch 534. Each of the other assigned channel strips 503-2 to 503-24 has the same configuration.

When one of the screen selection switches 501 is turned on, an editing screen for editing a variety of parameters corresponding to the switch is displayed. When a channel group to be assigned to the channel strips 503-1 to 503-24 is selected using layer switches 551 and 552 and 561 to 564 that will be described later, a screen for the assigned channels is displayed, while the screen selection switches 501 are used for other screen switching. On/off operators such as check boxes and switches for changing states of corresponding on/off parameters or value input operators such as faders, list buttons, and knobs for changing corresponding parameter values are displayed on the editing screen. A cursor displayed on the screen can be moved to a desired on/off operator or a desired value input operator using the cursor moving buttons 511 to 514 and the state or value of a parameter corresponding to the operator can be changed by operating the DEC button 515, the INC button 516, and the wheel 518. Most parameters are activated immediately when they are changed. However, this is not true for some parameters such as a patch setting-related parameter which heavy processes are used for changing. These parameters are activated when the enter key 517 is operated after a change is made to the parameters. This change is canceled if the enter key 517 is not operated. A mouse pointer is also displayed on the screen. The mouse pointer can be moved using the touchpad 519. Turning on the left button when the mouse pointer coincides with a value input operator on the screen brings the value input operator into a selected state, which has the same effect as when the cursor coincides with the value input operator. Dragging the mouse pointer while keeping the left button on can increase or decrease a parameter value corresponding to the value input operator. Turning on/off the left button when the mouse pointer coincides with an on/off operator on the screen can reverse the on/off state of a parameter corresponding to the on/off operator.

When one of the layer switches 551 to 552 and 561 to 564 is turned on, 24 channels corresponding to the layer switch are assigned to the assigned channel strips 503-1 to 503-24. The following is a detailed example. When the partial network A is selected as a control target using switches 571 to 576 that will be described later, the layer switch 561 is used to assign a layer of the 1st to 24th input channels (A1) of FIG. 4, the layer switch 562 is used to assign a layer of the 25th to 48th input channels (A3), and the layer switch 563 is used to assign a layer of the 49th to 72nd input channels. The layer switches 551 and 552 are used to assign the 1st to 12th output channels (A1) and the 25th to 48th output channels (A4), respectively. In this manner, a channel group of each layer is limited to channels that are implemented by one node. This system does not incorporate the 13th to 24th output channels since the node A1 performs processes of only the 12 channels. When the layer switch 561 is turned on, the 1st to 24th input channels are assigned to the assigned channel strips 503-1 to 503-24, respectively, to perform control of parameters (in addition to the signal level) associated with the assigned channels.

Reference numeral "541" denotes a login/logout button and "542" denotes a currently logged-in user name display region. When the login/logout button 541 is turned on when no one has logged in using the console, a login screen (see FIG. 6c) is displayed on the display 502 to allow a user to log in by entering a user name and password. The user name of the logged-in user is displayed on the display region 542. When the login/logout button 541 is turned on when no user has logged in, a logout check screen is displayed. The user can log out by expressing a desire to permit the logout on the check screen.

Scene-related operators 543 to 547 will now be described. The term "scene" (or scene data) refers to a combination of parameter data items (for example, connection states between input lines and input channels, connection states between output lines and output channels, parameter values set in the channels, etc.) used to specify setting states of the mixer. In this system, each of the nodes included in the audio system of each partial network includes a current memory that stores parameters used to control operations of the node. A master console that controls the partial network includes a nonvolatile current memory that stores parameters of the current memories of all the nodes. Each partial network registers and manages nodes included in the partial network in a current memory of its master console. When a parameter value set in the current memory of the console is changed according to an operation by the user, the console notifies all nodes, which are controlled by the parameter in the corresponding audio system, of the parameter value change. Upon receiving the notification, the nodes are activated to change the parameter value in their current memories according to the notification. Each of the nodes included in the audio system of each partial network includes a scene memory that can store a plurality of scenes of parameters contained in a current memory of the node. A master console that controls each partial network includes a nonvolatile scene memory that stores data of the scene memories of all the nodes. A variety of parameter data indicating setting states of an audio system constructed on the partial network, which is contained in each current memory, can be stored in a corresponding scene memory after assigning a scene number to the variety of parameter data. Conversely, a scene number can be specified to recall a scene from each scene memory to a corresponding current memory. Specifically, the user selects a scene number using the up button 546 and the down button 547 while viewing the scene number displayed on the display portion 543 and then recalls a scene of the scene number by depressing the recall button 545. In addition, a scene number is selected and the store button 544 is depressed to store currently set parameter values as a scene of the selected scene number. The user can perform the same operations using an up button, a down button, a recall button, a store button on a store/recall screen (described later) that is displayed on the display 502 by operating a scene editing screen switch among the screen selection switches 501.

The scene number display portion 543 displays information indicating a partial network, which is a current scene control target of the console, and a scene number of a currently recalled scene. In this system, for example, the audio system of the partial network A can use the functions of the nodes the other partial networks B, C, and D as described above. In this case, the audio system registers specific nodes of the other partial networks which it is desired to use, as nodes included in the audio system, in the master console, so that areas which store data of current and scene memories of the specific nodes are defined and initialized in the current and scene memories of the master console and data of the current and scene memories of the specific nodes are also initialized. Thereafter, the current and scene memories of the specific nodes follow a change in the current and scene memories of the master console in the same manner as the current and scene memories of other nodes included in the system follow. Specifically, when a change is made to data of the current or scene memory of the master console, the change is also reflected in the current and scene memories of the specific nodes of the other partial networks. When the master console is operated to store a scene, the master console stores parameters of its current memory in a specified scene area in the scene memory and transmits the store event to the nodes of the system (including the specific nodes of the other partial networks). Each node which has received the store event stores parameters of its current memory in a specified scene area in the scene memory. On the other hand, when the master console is operated to recall a scene, the master console recalls parameters of a specified scene in its scene memory to the current memory and transmits the recall event to its nodes (including the specific nodes of the other network). Each node which has received the recall event recalls parameters of a specified scene in its scene memory to the current memory. In this manner, the nodes included in the system collectively perform scene storage and recall in synchronization with scene storage and recall of the master console. Accordingly, the scene number display 543 displays information indicating a partial network (or a combination of a plurality of partial networks) which is a current scene control target of the console and a scene number as a set including the information and the scene number. The scene will be described in more detail with reference to screens of FIGS. 7a and 7b.

Reference numeral "550" denotes a group of switches for selecting a partial network which is a current control target of the console and for selecting a layer of the partial network. "571" to "576" denote switches for specifying an audio system of a partial network that is a control target of the console among an audio system of a partial network corresponding to the console and audio systems of other partial networks connected to the corresponding partial network through the connection network. Symbols "A" to "F" of these switches denote the partial networks. The switches of "A" to "D" are used and the switches of "E" and "F" are not used in the configuration of FIG. 2. By turning on a switch for a partial network other than the corresponding partial network, it is possible to control an audio system of the partial network using the console. In this case, current and scene memories of the audio system of the partial network other than the corresponding partial network in addition to the current and scene memories of the audio system of the corresponding partial network are provided in the console. "561" to "564" denote input channel layer switches for specifying which input channel layer is to be controlled in the audio system of a partial network that is selected as a current control target. In addition, output layer selection switches 551 and 552 are used to select an output channel layer to be controlled in the currently selected partial network. A larger number of these switches may be provided according to the number of control target partial networks or the number of layers.

A user who logs in through the console has a predetermined authority, which includes authority information of partial networks that can be operated by the user. Accordingly, for example when the user has the authority to operate the partial networks A, B, and C and has no authority to operate the partial networks D, E, and F, the partial network selection buttons 574 to 576 are disabled. A range of partial networks which each user can control using their console can be set within their authority. This control range setting will be described later with reference to FIG. 10. LEDs provided in selection buttons of partial networks that are not permitted to be operated by the user authority or the controllable range setting are turned off to indicate that they cannot be operated. LEDs of selection switches that can be operated are dimly lit and, when the selection switches are turned on, their LEDs are brightly lit.

By operating the operators or the like of the channel strip portion 503, it is possible to change parameters of a layer of specific channels of the audio system of the current selected partial network using the channel strips 503-1 to 503-24. Here, since the original of a current memory that stores a variety of parameters is present in the master console of the audio system, the master console of the audio system is notified of a parameter value change operation performed on any console. When receiving the notification, the master console changes a corresponding parameter value of its current memory and transmits the parameter value change event to a corresponding node in the audio system. When receiving the event, the node changes a corresponding parameter value in its current memory. When it is necessary to transmit a signal through a partial network or the connection network due to setting for line connection or routing from an input channel to a mixing bus in the input or output patch, the master console requests the master node to determine a transmission channel of the partial network or the connection network and then sets a variety of parameters for transmission of an audio signal using the transmission channel in its current memory and also transmits the parameter value change event to each node associated with the transmission. Each node which has received the event also changes a corresponding parameter value set in its current memory, thereby implementing the set line connection or routing.

A variety of data stored in current and scene memories of a master console in each audio system is master data (the original) and a variety of data stored in current and scene memories of the other devices in the audio system is slave data that is changed in synchronization with the master data when the master data is changed. As described above, the current and scene memories of the console are nonvolatile. When control of the system using the master console is initiated for example as the power of the system is turned on, the variety of data stored in the current and scene memories of the master console is transmitted to the corresponding nodes before the system control is initiated and the current and scene memories of each node of the audio system are synchronized with the data of the master console. Thereafter, when the user has performed an operation, first, the master data of the master console is changed and the change event is then transmitted to each node of the system and each node changes its slave data according to the change event. The purpose of placing the master data in the master console in this embodiment is to prevent control competition between devices which often occurs when the data is distributed over a plurality of devices and also to increase the control response to operations of the master console.

A fail safe function used when a malfunction has occurred in the console will now be described. When a malfunction has occurred in the console as shown in FIG. 5, the system of this embodiment can replace the console with another console in the same partial network or a console on another partial network connected through the connection network. The following is an overview of a procedure when the console is replaced. First, the order in which the master console is replaced with slave consoles of the system when a malfunction has occurred in the master console is previously registered. Specifically, the console replacement is performed sequentially in the registered order in such a manner that, when a malfunction has occurred in the master console, the master console is first replaced with a first registered slave console and, when a malfunction has occurred in the slave console, the slave console is replaced with a second registered slave console, and so on. When the system is in operation, each slave console checks at predetermined time intervals whether or not a master console of the system is present on the network system. If no master console is present and the next replacement console present on the system is that slave console, the slave console is raised to the status of the master node and starts operation of the master console of the system. If the next replacement console is a different slave console, the slave console notifies the different slave console that no master console is present and the slave console which has received the notification is then raised to the status of the master console. Even when the master console becomes absent, information stored in the current and scene memories of each node of the system is not changed so that the operation of each device is kept unchanged. Thus, the master console is replaced with a replacement console while the operation of each device is kept unchanged.

Figure 6B:
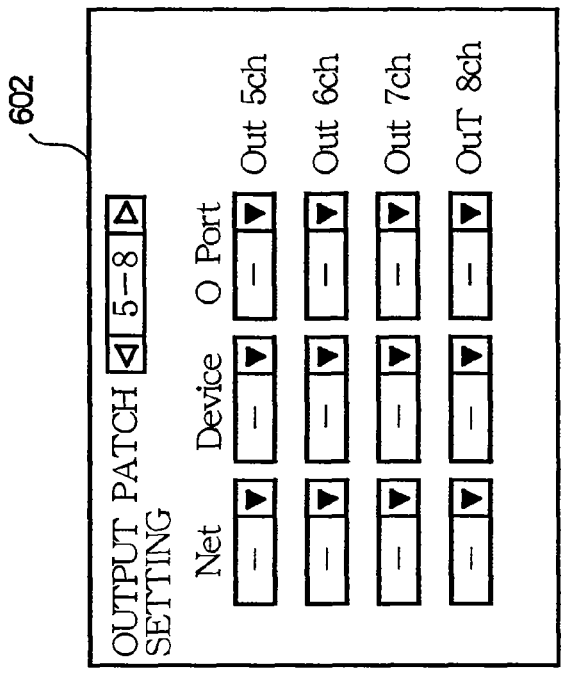
FIGS. 6a to 6c illustrate input and output patch setting screens and a login screen of the operating panel.
Figure 6A:
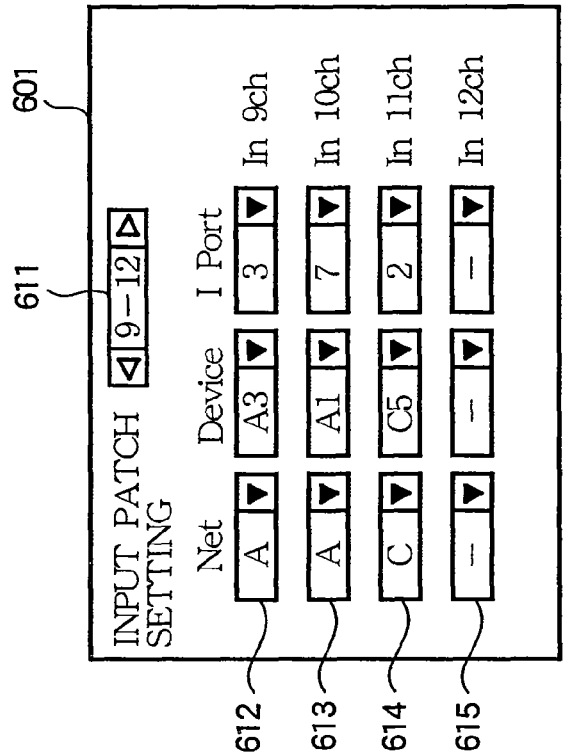

FIG. 6a illustrates an example of an input patch setting screen. This screen is displayed, for example, when the selection button 571 of the partial network A on the console of FIG. 5 has been turned on and a specific operation has been performed to instruct setting of the input patch. Setting of nodes to which the channels of the input channel potions 407 and 408 of FIG. 4 are to be assigned is performed on a different setting screen. An indicator "611" in the input patch setting screen of FIG. 6a indicates that this is a screen for performing patch setting of the 9th to 12th input channels. The input channels can be switched to other input channels on a 4-channel basis by turning on a right-facing triangular arrow or a left-facing triangular arrow on the indicator 611. Areas "612" to "615" show respective input patch settings of the 9th to 12th input channels. For example, "612" shows line connection of an input signal from an input port 3 of the node A3 of the partial network A to the 9th input channel. As shown by "614", it is also possible to assign an input port of a node of another partial network C if the node belongs to the system. FIG. 6b illustrates a screen 602 for performing output patch setting.

Setting information associated with line connection of the input or output patch is stored only in the current memory of the master console (and the slave console). Parameters of each node associated with the line connection of the system are produced based on the setting information and are then stored in the current memory of the master console. The parameters of each node are also transmitted to each node to be set in the node. For example, when the line connection is performed within one node as shown by "613", parameters of the node alone are produced and, when the line connection is performed through the partial network as shown by "612", parameters of both the transmitting and receiving-side nodes are produced and, when the line connection is performed through the partial network and the connection network as shown by "614", not only parameters of the transmitting and receiving-side nodes but also parameters of the relay node are produced. The parameters also include parameters for implementing line connection within the node such as parameters associated with transmission of the signal bus 115 or a microprogram provided to the DSP of the DSP card.

Figure 6C:
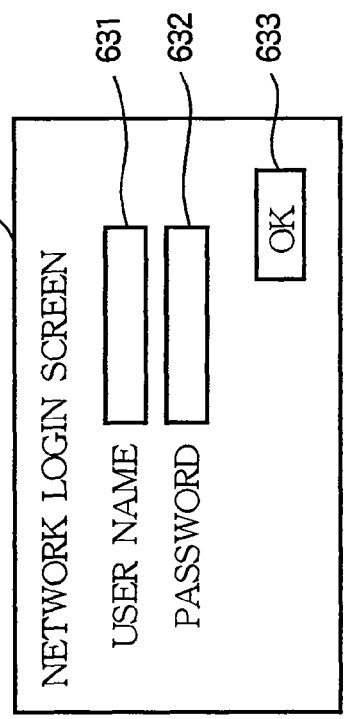

FIG. 6c illustrates an example of a login screen 603 that is displayed when the login/logout button 541 on the console is turned on. A user name input display area 631, a password input area 632, and an OK button 633 are provided on the screen. When a user name and a password are entered on this screen, an authentication process is performed based on user account information stored in the master console of the system. When the authentication is successful, the system can be used with an authority indicated by authority information included in the user account information.

Figure 7A:
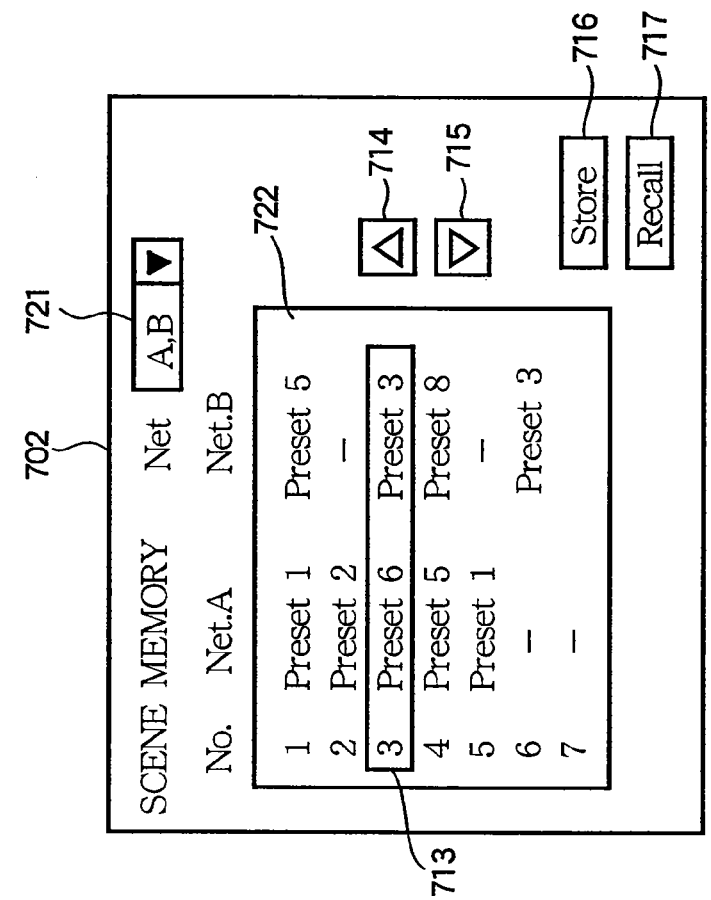
FIGS. 7a and 7b illustrate examples of screens for storing and recalling scene data.
Figure 7B:
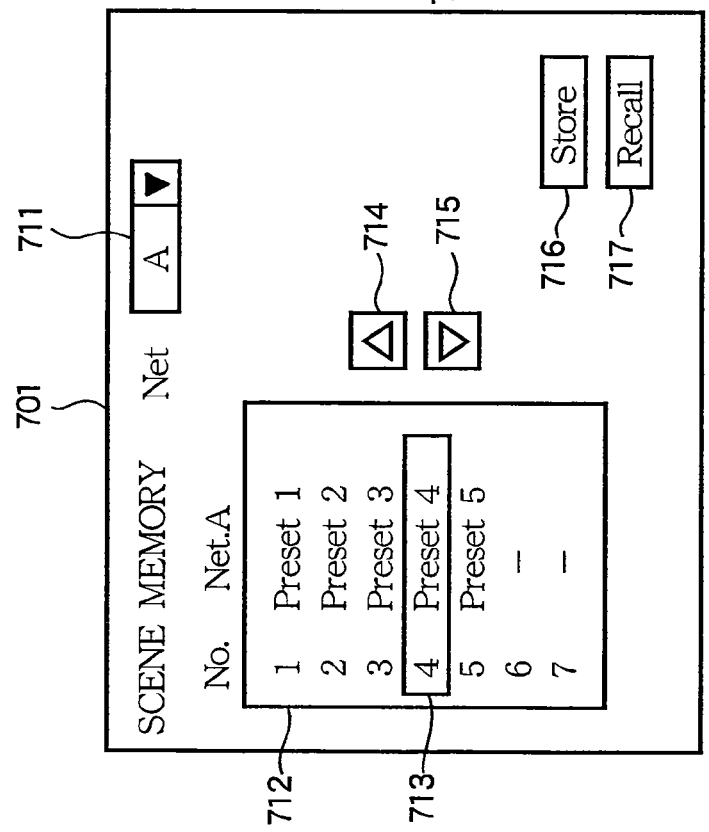

FIGS. 7a and 7b illustrate an example of a screen for storing and recalling scene data. In the system of this embodiment, scene can be stored or recalled over a plurality of networks according to the authority of the user.

FIG. 7a illustrates an example of a screen for storing/recalling a scene in one partial network A. Reference numeral "711" is an indicator that data of a current store/recall target scene memory is associated with the partial network A. The indicator 711 includes a list box. If the user clicks a downward arrow on the right side of the indicator 711, a list of partial networks within a range that the user can control through the console and combinations of these partial networks is displayed so that the user can select one option from the displayed list. For example, when the controllable range includes "A", "B", and "C", a list of 7 options "A", "B", "C", "A,B", "A,C", "B,C", and "A,B,C" is displayed. "712" denotes a list of scenes in the mixer system of the currently selected partial network A. "No." denotes a scene number. If the user places the cursor 713 at a scene number using the cursor moving buttons 714 and 715 and turns on the store button 716, a set of parameter values set in the nodes of the partial network A at that moment is stored as a scene of the scene number at which the cursor 713 is placed. "Preset*" denotes a file of a set of parameter values that is stored as a scene, where "*" is a number 1, 2, 3, . . . , indicating a preset number. When the store button 716 is turned on with the cursor being located at a scene number, regardless of whether or not "Preset*" is displayed, a preset number Preset* of a last recalled file, is assigned to the scene number if parameter values of the current memory have not been changed from those of the last recalled file Preset*, while a new preset number * is assigned to the scene and a corresponding file Preset* is created to store a set of the parameter values of the current memory if the parameter values of the current memory have been changed from those of the last recalled file Preset*. When the user performs a store operation, a corresponding file Preset* is stored in the scene memory of the master console of the system and information of the store operation is transferred to each node of the system and corresponding ones of the parameters of the file Preset* are stored in the scene memory of each node. The association between the scene numbers and the files Preset* is also stored in the scene memories of the master console and nodes of the system. In this example, a scene of the audio system of the partial network is stored. Therefore, for example when setting of a line connection through the connection network as shown by "614" of FIG. 6a has been performed, it is ignored without being saved with the store operation on the screen of FIG. 7a. If the cursor 713 is set to a scene number of the list 712 and the recall button 717 is then turned on, a set of parameters of a file Preset* of a corresponding scene of the scene memory is recalled to the current memory of the master console of the system and information of the recall operation is transferred to each node of the system and then corresponding ones of the parameters of the file Preset* of the scene in the scene memory of each node is recalled to the current memory of the node.

FIG. 7b illustrates an example of a scene store/recall screen 702 where the controllable range includes the partial networks A and B. "721" denotes an indicator that data of current store/recall target scene memories is associated with the partial networks A and B. A scene list 722 arranges and displays combinations of Preset* of the partial network A and Preset* of the partial network B in rows along with their scene numbers. If the cursor 713 is set to a scene number and the store button 716 is then turned on, parameters set in the partial networks A and B at that moment are stored as respective preset files Preset* of the partial networks A and B. For each of the partial networks, a preset number Preset* of a last recalled file is assigned to the scene number if parameter values of the current memory have not been changed from those of the last recalled file Preset*, while a new preset number * is assigned to the scene and a corresponding file Preset* is created to store a set of the parameter values of the current memory if the parameter values of the current memory have been changed from those of the last recalled file Preset*. When the user performs a store operation, a corresponding file Preset* of each partial network is stored in the scene memory of the system and information of the store operation is transferred to each node of the system. In addition, corresponding ones of the parameters of the file Preset* of the partial network A are stored in the scene memory of each node of the partial network A, while corresponding ones of the parameters of the file Preset* of the partial network B are stored in the scene memory of each node of the partial network B. The file Preset* of each partial network includes information of transmission channels of each partial network and the connection network set at that moment. In addition, the association between the scene numbers and the files Preset* of the partial networks A and B is also stored in the scene memories of the master console and nodes of the systems of the partial networks A and B. A description of a recall operation will be given with reference to FIG. 11.

Figure 8:
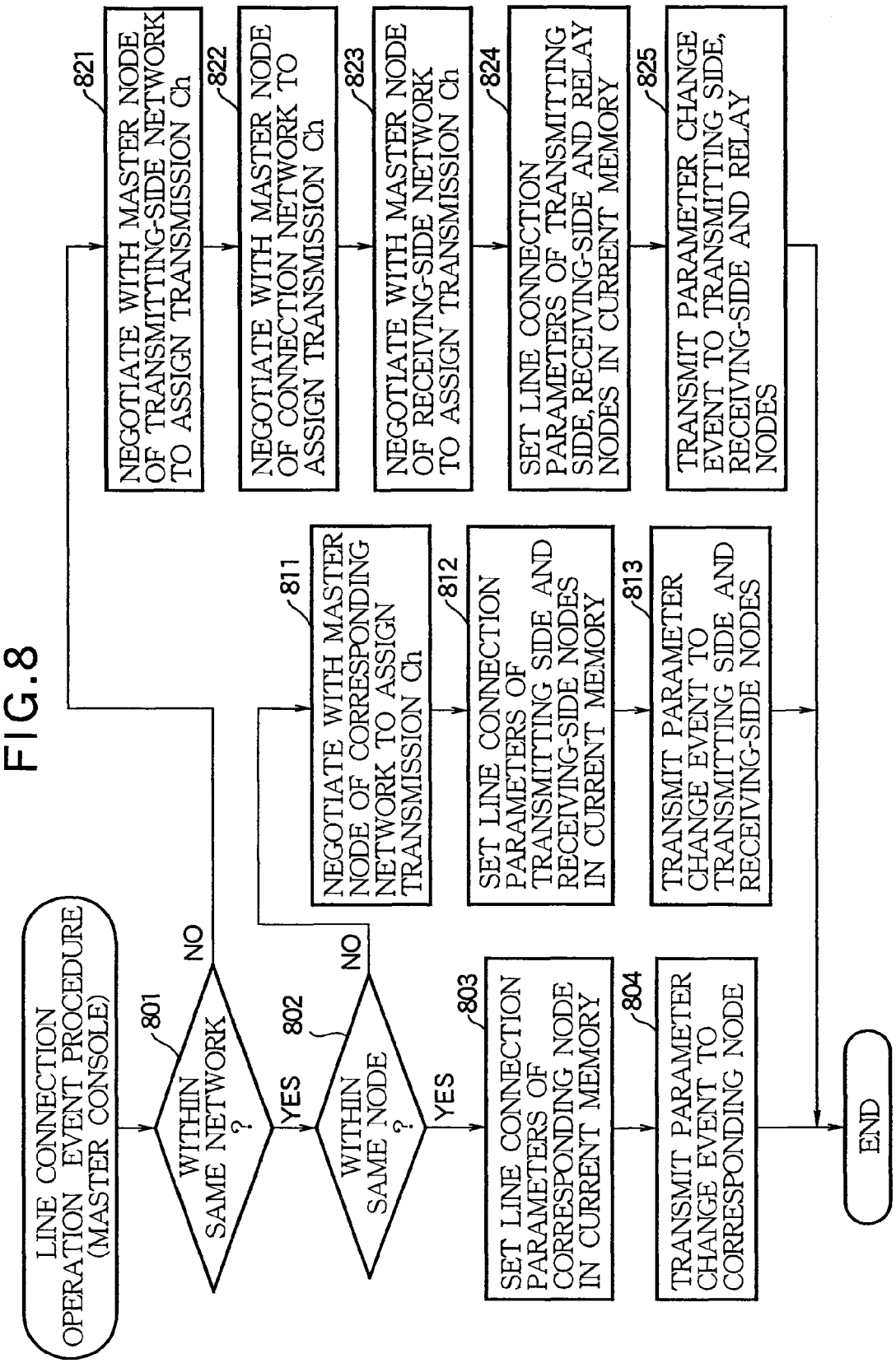
FIG. 8 is a flow chart of a line connection procedure executed in a master console.

FIG. 8 is a flow chart illustrating a procedure performed when an instruction is issued through a console in the case where a function of another node of a partial network or a function of a node of another partial network through the connection network is used. This procedure is to implement the processes described above in the cases (1-1) to (1-3) in the input patch 406 of FIG. 4. Here, a description will be given of a procedure where new line connection setting is performed on the input patch setting screen of FIG. 6a.

When receiving a line connection event, the master console determines at step 801 whether or not both nodes including a transmitter and a receiver of an audio signal, which will also be referred to as transmitting and receiving-side nodes, are within the same partial network. If the nodes of the transmitter and receiver are within the same partial network, the master console determines at step 802 whether or not the transmitter and the receiver of the audio signal are within the same node. If the transmitter and the receiver are within the same node, for example, when the setting 613 in FIG. 6a is performed, the master console sets line connection parameters of the node in its current memory at step 803 and transmits a parameter change event to the node at step 804. Upon receiving the change event, the node changes its in-node line connection parameters associated with the line connection. Line connection within one node is implemented in this manner.

If it is determined at step 802 that the transmitter and the receiver are not within the same node, for example, when the setting 612 in FIG. 6a is performed, the master console negotiates, at step 811, with a master node in the partial network which includes the transmitting and receiving-side nodes to assign a transmission channel. The master console sets, at step 812, respective line connection parameters of the transmitting and receiving-side nodes in the current memory of the master console and transmits, at step 813, respective parameter change events to the transmitting and receiving-side nodes. Upon receiving the change event, the transmitting-side node changes its in-node line connection parameters and its transmitting-side parameters of partial network line connection associated with the line connection. Upon receiving the change event, the receiving-side node changes its receiving-side parameters of partial network line connection and its in-node line connection parameters associated with the line connection. Line connection through one partial network is implemented in this manner.

If it is determined at step 801 that the transmitting and receiving-side nodes are not within the same partial network, for example, when the setting 614 in FIG. 6a is performed, the master console negotiates, at step 821, with the master node of the partial network including the transmitting-side node to assign a transmission channel. The master console then negotiates, at step 822, with the connection master of the connection network to assign a transmission channel. The master console then negotiates, at step 823, with a master node of a partial network including the receiving-side node to assign a transmission channel. The master console then sets, at step 824, respective line connection parameters of the transmitting-side node, the receiving-side node, and a relay node in the current memory of the master console. The master console then transmits, at step 825, a parameter change event to each of the transmitting and receiving-side nodes and the relay node. Upon receiving the change event, the transmitting-side node changes its in-node line connection parameters and its transmitting-side parameters of partial network line connection associated with the line connection. Upon receiving the change event, the receiving-side node changes its receiving-side parameters of partial network line connection and its in-node line connection parameters associated with the line connection. Upon receiving the change event, each relay node sets parameters for relay between the corresponding partial networks and the connection network. Line connection of two partial networks is implemented in this manner.

Figure 9A:
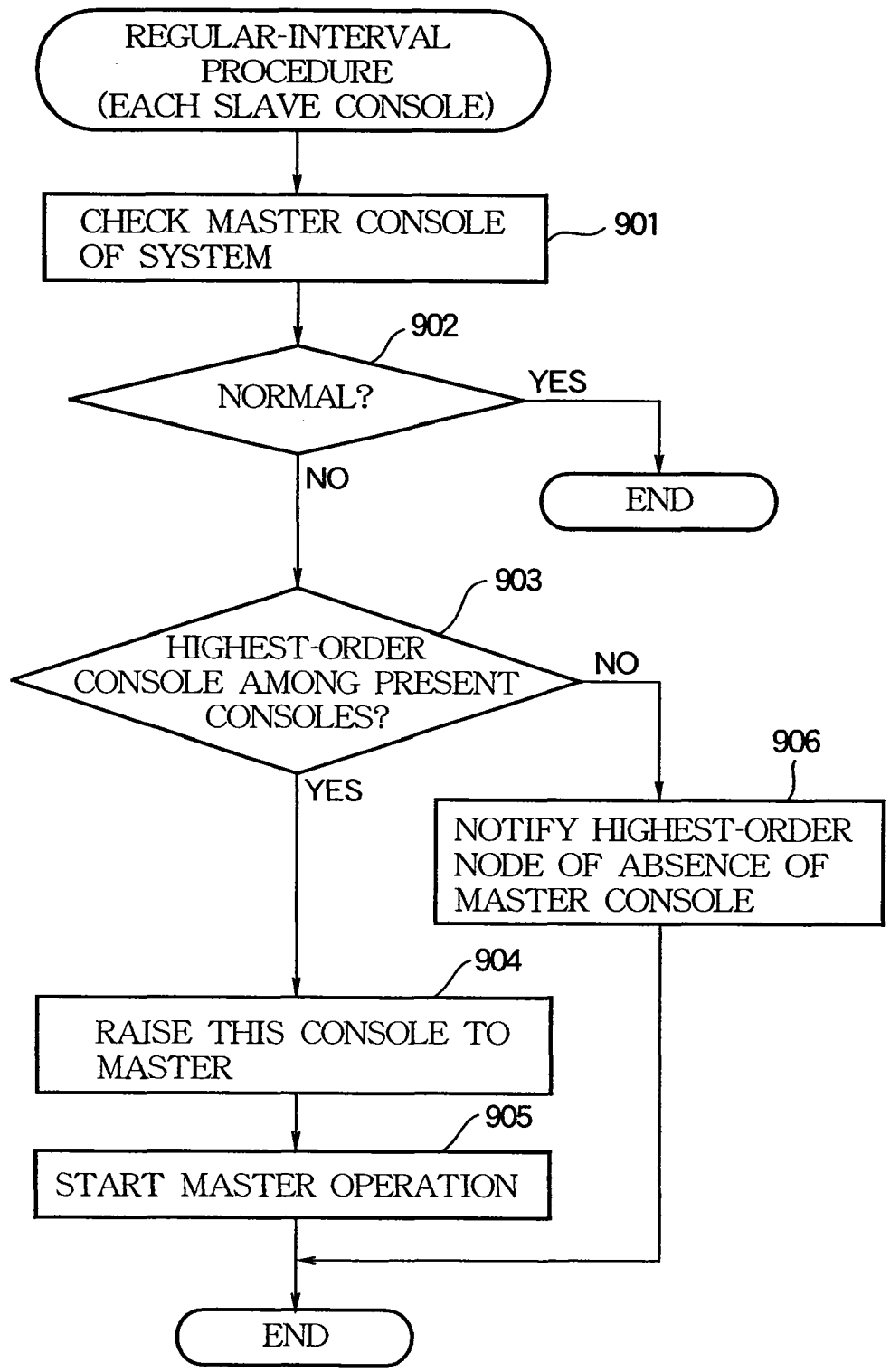
FIGS. 9a and 9b are flow charts of a regular-interval procedure and a master switching event procedure executed in each slave console.

FIG. 9a illustrates a regular-interval console check procedure that each slave console repeatedly performs at predetermined time intervals. At step 901, each slave console checks the master console of the system. If the master console operates normally at step 902, the slave console terminates the procedure'. If the master console operates abnormally, the slave console determines, at step 903, whether or not it is the first replacement console (i.e., the highest-order console) among consoles present on the system. If it is the first replacement console, the slave console performs a process for raising it to the status of the master console at step 904 and starts operation of the master console at step 905. If it is determined at step 903 that it is not the first replacement console, the slave console notifies the first replacement slave console of the absence of the master console at step 906. The slave console which has received the notification starts operation of the master console by performing the same processes as those of the above steps 904 and 905. Alternatively, the master console may detect its malfunctioning and then instruct a slave console to serve as a master.

Figure 9B:
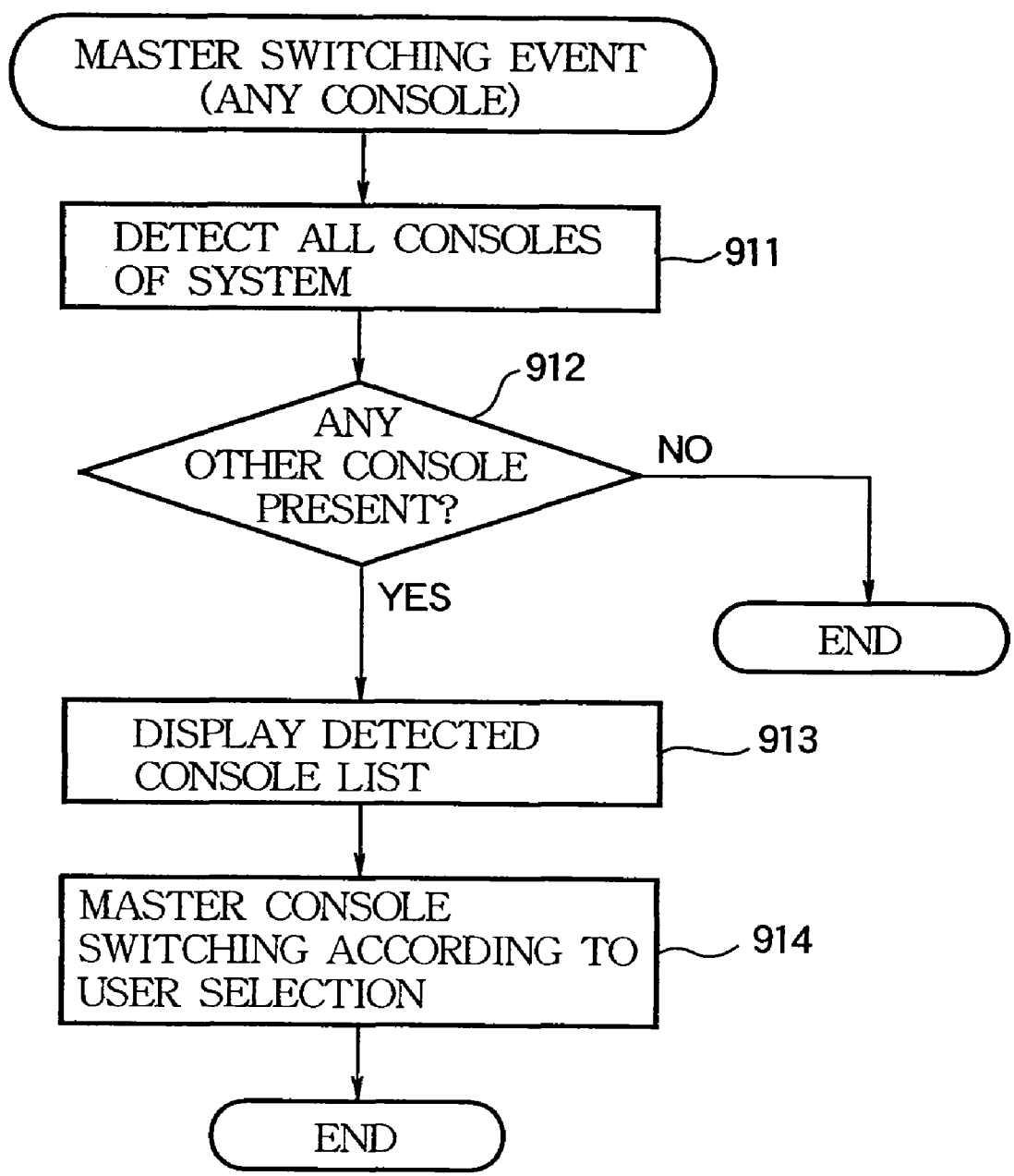

FIG. 9b illustrates a procedure performed when the user explicitly performs a master console switching operation on a console. This master console switching is performed at any console of the audio system. The console detects all consoles on the system at step 911. Then, the console determines, at step 912, whether or not any console other than the console is present. The console terminates the procedure if no other console is present, i.e., when the console as a master node determines that any console other than the master node is not present on the system. If any console or consoles other than the console are present, the console displays a list of the detected consoles at step 913 and performs master console switching according to a selection operation of the user at step 914.

Figure 10A:
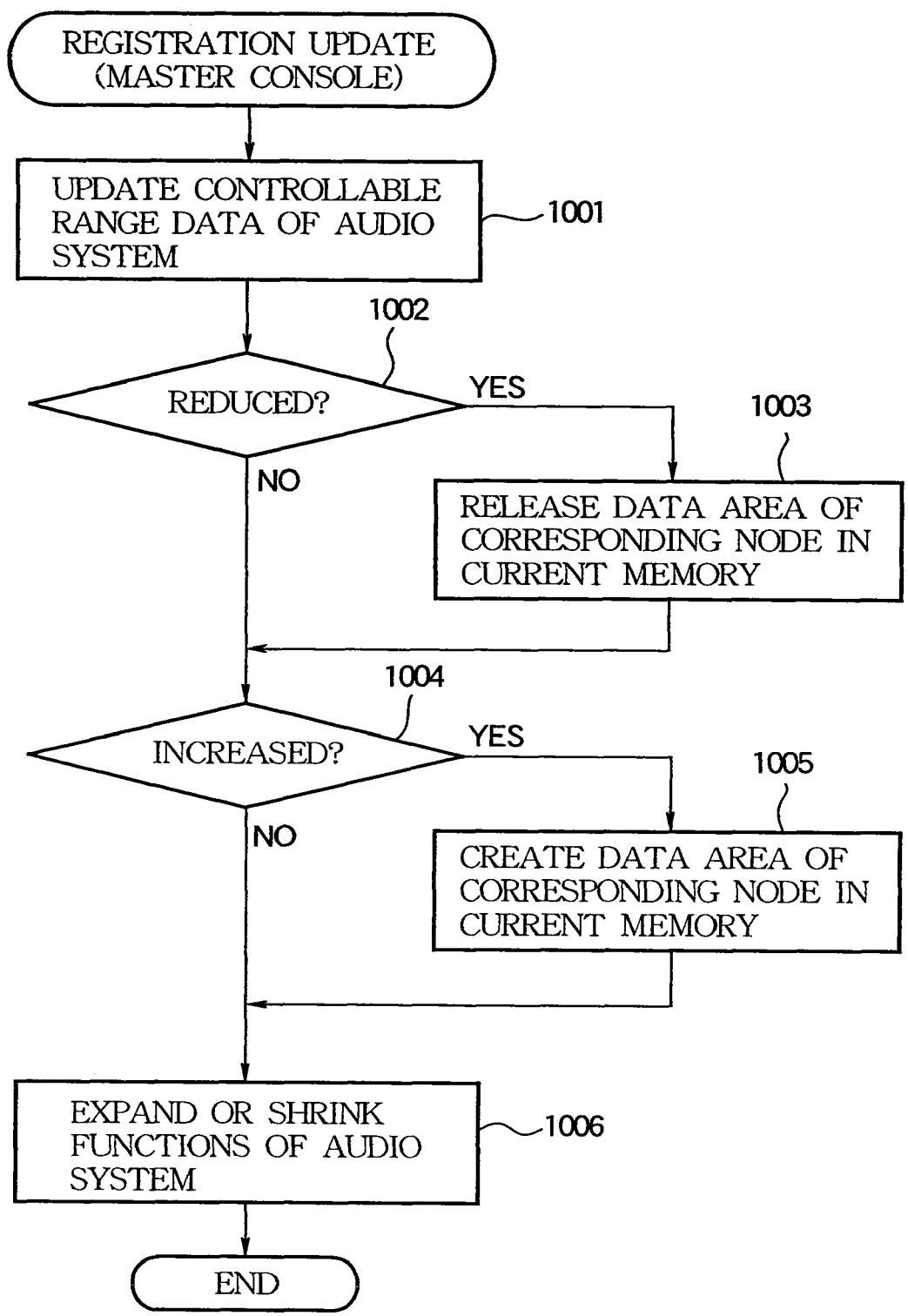
FIGS. 10a and 10b illustrate a registration change procedure executed in a node and a console, and a registration screen, respectively.
Figure 10B:
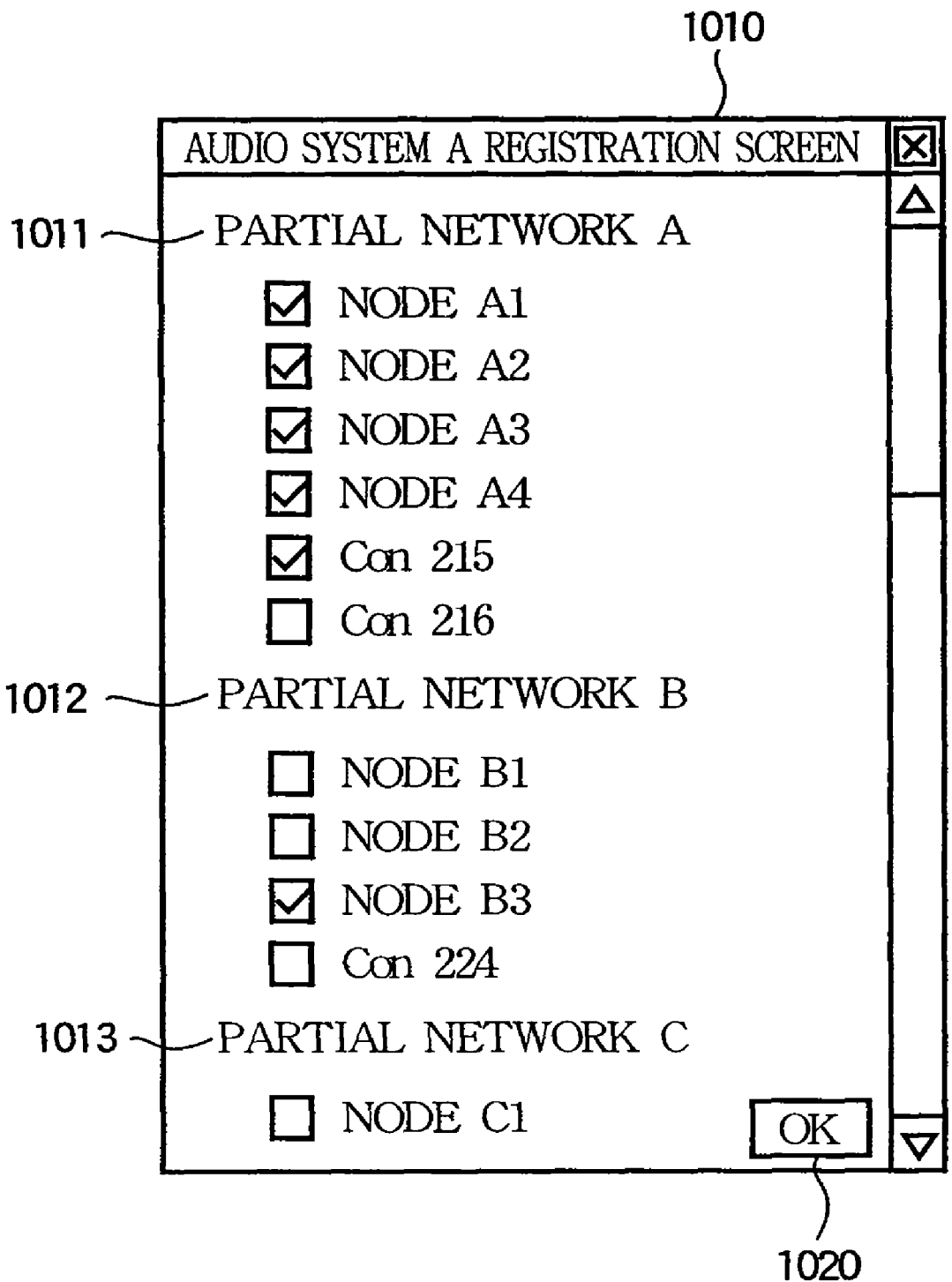

FIG. 10a illustrates a procedure where the user performs an operation for instructing the audio system to register each device on the master console. FIG. 10b illustrates a screen for the registration. When the user performs a specific operation on the master console, the registration screen of FIG. 10b is displayed. A list of partial networks that can be controlled on the console is displayed on the registration screen 1010 as denoted by "1011" to "1013" to allow the logged-in user to determine a controllable range according to their authority. For each of the partial network, a list of nodes and consoles connected to the partial network is also displayed with their check boxes. Turning on an OK button 1020 after checking the check boxes activates the procedure of FIG. 10a, so that the checked nodes and consoles of the partial networks are registered as a controllable range. Nodes that have already been registered on another audio system may be grayed out on the registration screen of FIG. 10b so that they cannot be registered.

In the procedure of FIG. 10a, first, the master console updates controllable range data indicating the controllable range of the audio system based on the setting of registration screen of FIG. 10b. If it is determined at step 1002 that the controllable range has been reduced, the master console releases a data area of a node or console, which has been unchecked on the registration screen, in the current memory of the master console at step 1003. If it is determined at step 1004 that the controllable range has been increased, the master console creates a data area of a node or console, which has been checked on the registration screen, in the current memory of the master console at step 1005. The master console expands or shrinks the functions of the audio system based on the setting of the registration screen at step 1006.

Figure 11:
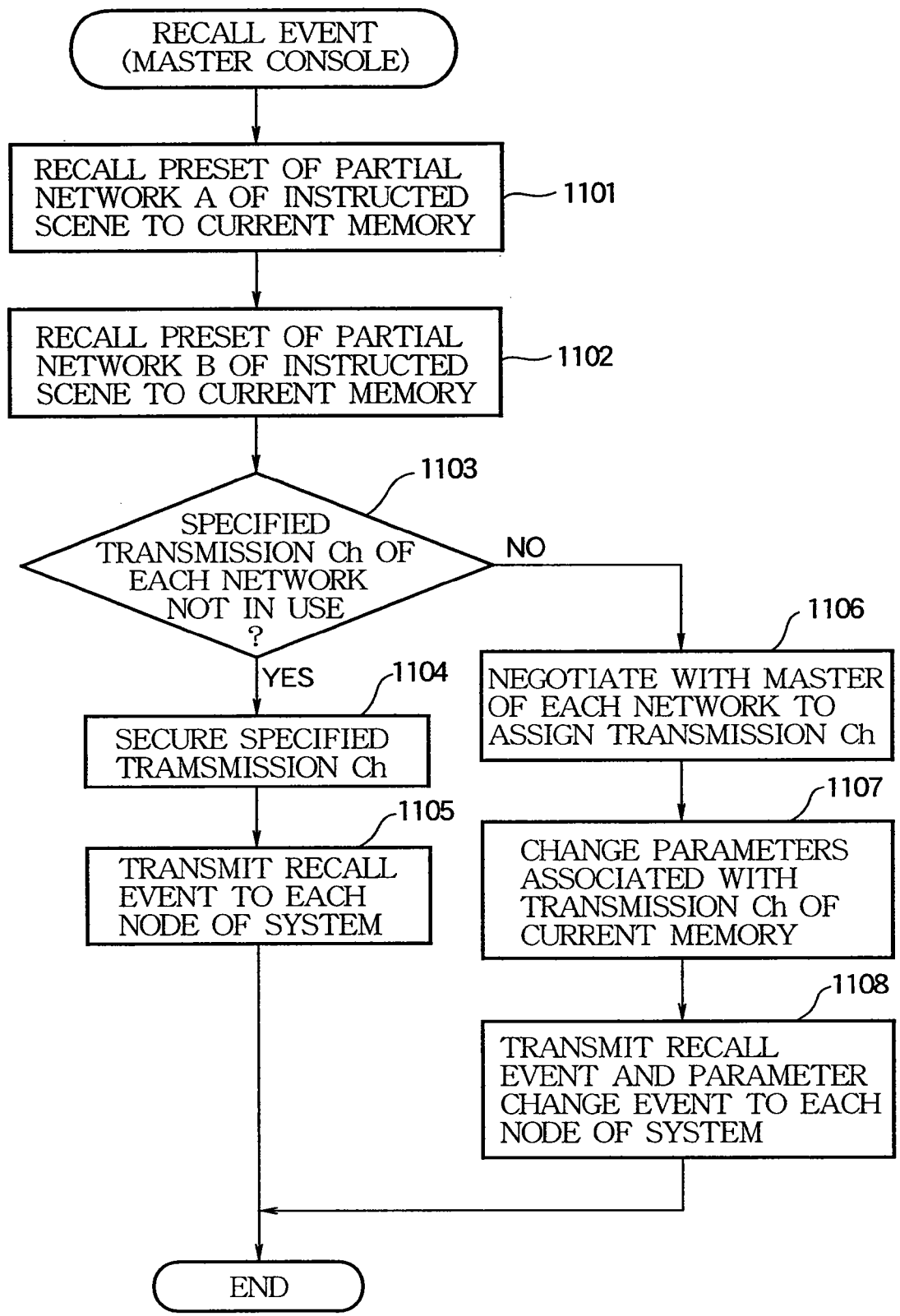
FIG. 11 is a flow chart of a recall event procedure executed in a master console.

FIG. 11 illustrates a procedure that the master console performs when an instruction to recall a scene has been issued. In the following description, it is assumed that the scene that an instruction to recall has been issued requires that a connection transmission channel be assigned. It is also assumed that a scene of a combination of a preset file "Preset" of the partial network A and a preset file "Preset" of the partial network B is recalled. As described above with reference to FIG. 7b, a preset file of each partial network includes information of transmission channels used in the partial network and the connection network.

First, at step 1101, the master console recalls the preset file of the partial network A of the scene that has been instructed to be recalled to the current memory. At step 1102, the master console recalls the preset file of the partial network B of the scene that has been instructed to be recalled to the current memory. At step 1103, the master console determines whether or not transmission channels of the partial and connection networks set in the preset file of each of the partial networks A and B are currently not in use. If they are not in use, the master console secures the transmission channels of the partial networks A and B and the connection network at step 1104 and transmits a recall event to each node of the system at step 1105. If the transmission channels are currently in use, the master console negotiates with the master node of each of the partial networks and the connection network to assign transmission channels at step 1106. Then, the master console updates parameters associated with transmission channels in the current memory based on the assigned transmission channels at step 1107 and transmits a recall event and a parameter change event to each node of the system at step 1108. Although FIG. 11 illustrates that the processes of steps 1103 to 1108 are collectively performed for the partial networks and the connection network, the processes of steps 1103 to 1108 are actually performed individually for each of the networks. For example, if the transmission channel of the partial network A is not in use while the transmission channel of the partial network B is in use, steps 1104 and 1105 are performed for the partial network A while steps 1106 to 1108 are performed for the partial network B. In this method, if the transmission channels used when the scene was saved are not in use, the scene is recalled without alteration and, if the transmission channels are in use, the scene is recalled by assigned new transmission channels and changing the transmission channels for use to the assigned transmission channels. This method makes it possible to implement recall of a scene which requires that transmission channels be assigned, regardless of availability of transmission channels. This method also achieves high-speed recall since it is only necessary to recall parameters of the scene as they were if the transmission channels used when the scene was saved are available.

Each node may include different numbers of slots as is denoted by " . . . " in the card I/O unit 105 of FIG. 1. In addition, the same functions such as Ain, Aout, and DSP as those implemented by the cards installed in the slots may be fixedly provided in each node. In this case, the functions are incorporated into the board of the engine 100 and cards having the same functions are not installed in the slots although incorporating the functions into the board is equivalent to fixedly installing cards having the functions in some of the cards shown in FIG. 1. The display of the console may display used states of transmission bands of the partial networks or the connection network, for example, display how much the transmission bands are in use in percentage.

The invention claimed is:

1. A method for performing line connection from a transmitter to a receiver in an audio network system including a control device and a plurality of nodes each being capable of inputting, outputting or processing an audio signal, and each being detachably connected to one of a plurality of partial networks, that can work independently from each other, for transmission of the audio signals among the connected nodes by using transmission channels in time-divisional manner, the nodes connected to each of the partial network including a partial master node and a connection node, the partial master node controlling the transmission of the audio signals within the partial network and the connection node being connected to a connection network so as to connect the plurality of the partial networks with each other through the connection nodes, the connection network performing transmission of the audio signals by using transmission channels in time-divisional manner within the connection network, one of the connection nodes being a connection master node for controlling the transmission of the audio signals in the connection network, the method comprising steps of:

displaying a connection setting screen on a display of the control device;

accepting a user operation on the connection setting screen intending to set a connection between a transmitter and a receiver;

in response to the user operation, in case of (1) the transmitter and the receiver being in a same node, setting the node to route an audio signal from the transmitter to the receiver;

in case of (2) the transmitter being in a first node connected to a partial network and the receiver being in a second node being connected to the same partial network, assigning a transmission channel of the partial network, setting the first node to transmit an audio signal of the transmitter in the first node to the partial network using the transmission channel, and setting the second node to receive the audio signal from the partial network and provide the signal to the receiver in the second node;

in case of (3) the transmitter being in a first node connected to a first partial network and the receiver being in a second node connected to a second partial network other than the first partial network, while a first connection node of the first partial network and a second connection node of the second partial network are connected to a connection network, assigning a first transmission channel of the first partial network, assigning a second transmission channel of the second partial network, assigning a third transmission channel of the connection network, setting the first node to transmit an audio signal of the transmitter in the first node to the first partial network using the transmission channel, setting the first connection node to receive the audio signal from the first partial network and transmit the audio signal to the connection network using the third transmission channel, setting the second connection node to receive the audio signal from the connection network and transmit the audio signal to the second partial network using the second transmission channel, and setting the second node to receive the audio signal from the second partial network and provide the signal to the receiver in the second node.

2. The method according to claim 1, wherein the transmitter is an input port, and the receiver is an input channel.

3. The method according to claim 1, wherein the transmitter is an input channel, and the receiver is a mixing bus.

4. The method according to claim 1, wherein the transmitter is an output channel, and the receiver is an output port.

* * * * *